(12) United States Patent
James et al.

(10) Patent No.: US 12,269,591 B2
(45) Date of Patent: Apr. 8, 2025

(54) UNMANNED AERIAL VEHICLE SWARM PATH PLANNING

(71) Applicant: NOBLIS, INC., Reston, VA (US)

(72) Inventors: Scott James, Arlington, VA (US); Robert Raheb, Gaithersburg, MD (US)

(73) Assignee: NOBLIS, INC., Reston, VA (US)

( * ) Notice: Subject to any disclaimer, the term of this patent is extended or adjusted under 35 U.S.C. 154(b) by 302 days.

(21) Appl. No.: 17/873,480

(22) Filed: Jul. 26, 2022

(65) Prior Publication Data

US 2023/0081963 A1    Mar. 16, 2023

Related U.S. Application Data

(60) Provisional application No. 63/241,749, filed on Sep. 8, 2021.

(51) Int. Cl.
*B64C 39/02*        (2023.01)
*G05D 1/00*         (2024.01)

(52) U.S. Cl.
CPC ........... *B64C 39/024* (2013.01); *G05D 1/104* (2013.01); *B64U 2201/20* (2023.01)

(58) Field of Classification Search
CPC ...... B64C 39/024; B64C 39/02; G05D 1/104; G05D 1/00; B64U 2201/20
See application file for complete search history.

(56) References Cited

U.S. PATENT DOCUMENTS

| | | | | |
|---|---|---|---|---|
| 7,912,631 B2* | 3/2011 | Howard | .................. | F41G 7/007 |
| | | | | 701/519 |
| 8,234,067 B2* | 7/2012 | Bauer | .................. | G01C 21/005 |
| | | | | 701/467 |
| 10,902,726 B2* | 1/2021 | Alvarez | .................. | G08G 1/162 |
| 11,099,556 B2* | 8/2021 | Oqab | ........................ | A63K 1/00 |
| 11,117,255 B2* | 9/2021 | Skaaksrud | ............. | G05D 1/225 |
| 2020/0117220 A1* | 4/2020 | Paglieroni | ............ | G08G 5/0069 |

OTHER PUBLICATIONS

"Quantum Computing for Landing Aircraft," 2019 Integrated Communications, Navigation and Surveillance Conference (ICNS), Herndon, Virginia, Apr. 9-11, 2019, 9 pages.
James et al., "Path Planning for Critical ATM/UTM Areas," 2019 IEEE/AIAA 38th Digital Avionics Systems Conference (DASC), San Diego, California, Sep. 8-12, 2019, 6 pages.

* cited by examiner

*Primary Examiner* — Yonel Beaulieu
(74) *Attorney, Agent, or Firm* — Morrison & Foerster LLP

(57) ABSTRACT

Disclosed herein are systems and methods for path planning for UAVs. A set of UAVs is logically arranged into a plurality of swarms, each having a swarm-leader UAV. A first path planning algorithm is applied to determine navigation instructions to steer the swarm-leader UAVs towards respective destinations for the swarms and to deconflict the swarm-leader UAVs from one another. A set of second path planning algorithms is applied to determine navigation instructions to steer non-swarm-leader UAVs in each swarm toward their respective swarm leaders and to deconflict the UAVs from other UAVs in the swarm. Separate QUBO path planning algorithms may be used for the first path planning algorithm and the set of second path planning algorithms. If merging criteria for combining two swarms are met, a single QUBO may be used to control all non-swarm-leader UAVs in merged swarms.

34 Claims, 29 Drawing Sheets
(3 of 29 Drawing Sheet(s) Filed in Color)

UNMANNED AERIAL VEHICLE SWARM PATH PLANNING

CROSS-REFERENCE TO RELATED APPLICATIONS

This application claims the priority of U.S. Provisional Application No. 63/241,749, filed Sep. 8, 2021, the entire contents of which are incorporated herein by reference.

FIELD

This relates generally to autonomous vehicle control, and more specifically to systems and methods for optimizing control for unmanned aerial vehicles (UAVs) (also called unmanned aircraft) arranged into multiple UAV swarms.

BACKGROUND

One of the most critical and computationally complex operations in aircraft control is path planning. Path planning involves temporospatial operations such as rescheduling, holding, and interleaving flights and the complexity of these temporospatial operations rises rapidly with the number of aircraft involved. Beyond conventional aircraft, the rapid expansion of unmanned aerial vehicles (UAVs) into the common airspace further drives the need for an automated approach to aviation path planning.

SUMMARY

As described above, the complexity of aircraft path planning rises rapidly with increases in the number of aircraft involved. At a given instance in time, only one aircraft can utilize a particular portion of a path, and adjacent paths must be spatially separated by a certain distance to avoid collisions. While various techniques for 4D path planning for aircraft and UAVs have been proposed, many of those techniques are computationally infeasible at the scale that is required today, or would be computationally infeasible at the scales that would be required in the foreseeable future, for example as the number of aircraft and UAVs in proximity to one another in dense urban environments continues to increase. Accordingly, there is a need for improved techniques for performing UAV path planning for a plurality of UAVs in proximity to one another, wherein said techniques accomplish the goals of steering UAVs towards their respective intended destinations while avoiding confliction (e.g., avoiding collisions and near-misses), and wherein said techniques offer improved computational efficiency and feasibility over known systems and methods.

Disclosed herein are systems and methods that may address the above-identified needs. According to the techniques disclosed herein, systems for hierarchical swarm-based 4D UAV path planning that accomplish attraction toward a destination, deconfliction amongst UAVs, and improved computational feasibility over known systems are provided. A plurality of UAVs are arranged logically into a plurality of swarms, wherein each swarm includes a subset of the UAVs that intend to navigate toward a common destination. Control over the UAVs is then performed by decomposing the control problem into two logical levels: a swarm level and an individual UAV level. A first path planning algorithm is applied to generate navigation instructions that steer each swarm as a whole toward its respective intended destination, and to avoid confliction of a swarm as a whole with other swarms. Simultaneously, a second path planning algorithm is applied to generate navigation instructions that steer individual UAVs within a swarm and to avoid confliction between individual UAVs in the swarm with one another. More specifically, the second path planning algorithm may be configured to steer UAVs within a swarm toward a "swarm leader" UAV for the swarm, while the swarm leader itself may be steered by the first path planning algorithm towards the swarm's intended destination.

By decomposing the path planning problem into two (or more) hierarchical levels, computational feasibility may be improved in a number of ways. First, computational resources may not be expended on unnecessary deconfliction of UAVs that are distant from one another, such as UAVs that are in different swarms. Second, the need to perform deconfliction between UAVs that are in different swarms may be reduced by applying the first path planning algorithm to attempt to avoid or minimize confliction of separate swarms. Third, computations may be simplified by steering the majority of UAVs in the system toward local swarm-leader UAVs, such that only a small number of UAVs in the overall system (the swarm leaders) need to be considered in path planning for the purpose of steering towards overall intended swarm destination and for the purpose of inter-swarm deconfliction.

In some instance, it may be unavoidable that two swarms operate in close proximity to one another, or in spatial overlap with one another. In these situations, it may be necessary to perform deconfliction between individual UAVs that are in different swarms from one another. Thus, the system may, in some embodiments, apply the second path planning algorithm collectively to a cluster of UAVs that are in multiple swarms. While performing UAV-to-UAV deconfliction across different swarms may increase computational demands, the situations in which this is necessary may be limited by first path planning algorithm causing swarms to strive to avoid one another. Furthermore, the system may apply one or more tests to determine when it is necessary to form an inter-swarm cluster and perform more computationally intensive inter-swarm deconfliction.

In some embodiments, the path planning algorithms at both logical levels of the system (e.g., the first path planning algorithm and the second path planning algorithm) may both be executed at a same processing location, for example at the same set of central servers. In some embodiments, the first algorithm may be executed at a central location while the second algorithm may be executed at one or more servers located locally to the swarm for which the algorithm is performed. For example, the second path planning algorithm may be executed by one or more servers disposed onboard a UAV in the swarm, for example onboard the swarm-leader UAV.

In some embodiments, one or more of the first and second path planning algorithms may include a Quadratic Unconstrained Boolean Optimization (QUBO), which may optionally be executed using one or more quantum processors.

In some embodiments, a first system, for unmanned aerial vehicle (UAV) control, is provided, the first system comprising: a plurality of UAVs, wherein the plurality of UAVs is divided into a plurality of respective UAV swarms, each UAV swarm comprising a respective subset of the plurality of UAVs, each subset including a respective swarm-leader UAV; one or more processors configured to: receive first state data specifying respective position data and respective heading data corresponding to each of the swarm-leader UAVs; execute a first control algorithm configured to determine first respective navigation instructions for each of the respective swarm-leader UAVs, based on the first state data, to navigate each of the respective swarm-leader UAVs toward a respective destination and to avoid confliction with the other swarms; cause transmission of first respective control signals to the swarm-leader UAVs, wherein the respective control signals indicate the first respective navigation instructions for the respective swarm-leader UAV; receive second state data specifying respective position data and respective heading data corresponding to each UAV of a first set of UAVs, wherein the first set of UAVs comprise UAVs in a first swarm of the plurality of respective UAV swarms; execute a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and cause transmission of second respective control signals to UAVs in the first set, wherein the second respective control signals indicate the second respective navigation instructions for the respective UAVs in the first set.

In some embodiments of the first system, executing the first control algorithm comprises: generating one or more respective first groups of mutually exclusive maneuverability options for each of the swarm-leader UAVs; and determining the first respective navigation instructions by generating a first solution representing, for each of the one or more respective first groups of mutually exclusive maneuverability options for each of the plurality of swarm-leader UAVs, a respective lowest-cost maneuverability option for the respective swarm-leader UAV; and executing the second control algorithm comprises: generating one or more respective second groups of mutually exclusive maneuverability options for each of the UAVs in the first set; and determining the second respective navigation instructions by generating a second solution representing, for each of the one or more respective second groups of mutually exclusive maneuverability options for each of the plurality of UAVs in the first set, a respective lowest-cost maneuverability option for the respective UAVs in the first set.

In some embodiments of the first system: executing the first control algorithm comprises: calculating, based on the first state data, a respective distance to the respective destination for each of the respective swarm-leader UAVs; calculating, based on the first state data, a respective inter-UAV repulsion for each of the respective swarm-leader UAVs; and generating the one or more first groups of mutually exclusive maneuverability options based on the respective distance to the respective destination for each of the respective swarm-leader UAVs and on the respective inter-UAV repulsion for each of the respective swarm-leader UAVs; and executing the second control algorithm comprises: calculating, based on the second state data, a respective distance to the swarm-leader UAV for the respective UAVs in the first set; calculating, based on the second state data, a respective inter-UAV repulsion for each of the respective UAVs in the first set; and generating the one or more second groups of mutually exclusive maneuverability options based on the respective distances to swarm-leader UAV for each of the respective UAVs in the first set and on the respective inter-UAV repulsion for each of the respective UAVs in the first set.

In some embodiments of the first system, inter-UAV repulsion for each of the respective swarm-leader UAVs and inter-UAV repulsion for each of the respective UAVs in the first set are weighted differently, such that repulsion between pairs of UAVs in the first set is weaker than repulsion between UAVs in different swarms.

In some embodiments of the first system, the one or more processors are configured to: receive third state data specifying respective position data and respective heading data corresponding to each UAV of a second set of UAVs, wherein the second set of UAVs comprise UAVs in a second swarm of the plurality of respective UAV swarms; determine, based on one or more of the first state data, the second state data, and the third state data, whether a first set of one or more merging criteria are satisfied; if it is determined that the first set of one or more merging criteria are not satisfied: execute a third control algorithm, separate from the second control algorithm, with respect to the second set of UAVs, wherein the third control algorithm is configured to determine third respective navigation instructions for each UAV in the second set, based on the third state data, to navigate each of the respective UAVs in the second set toward a swarm-leader UAV for the second swarm and to avoid confliction with other UAVs in the second set; and cause transmission of third respective control signals to UAVs in the second set, wherein the third respective control signals indicate the third respective navigation instructions for the respective UAVs in the second set; and if it is determined that the first set of one or more merging criteria are satisfied: execute the second control algorithm collectively with respect to the first set of UAVs and the second set of UAVs, wherein determining the second respective navigation instructions comprises determining the second respective navigation instructions for each UAV in the second set, based on the second state data and the third state data, to navigate each of the respective UAVs in the second set toward a swarm-leader UAV for the second swarm and to avoid confliction with other UAVs in the first set and in the second set; and cause transmission of the second respective control signals to UAVs in the second set.

In some embodiments of the first system, executing the second control algorithm collectively comprises: generating one or more respective second groups of mutually exclusive maneuverability options for each of the UAVs in either the first set or the second set; and determining the second respective navigation instructions by generating a second solution representing, for each of the one or more respective second groups of mutually exclusive maneuverability options for each of the plurality of UAVs in either the first set or the second set, a respective lowest-cost maneuverability option for the respective UAVs in either the first set or the second set.

In some embodiments of the first system, determining whether the first set of one or more merging criteria are satisfied comprises determining whether one or more UAVs in the first swarm are within a threshold minimum distance from one or more UAVs in the second swarm.

In some embodiments of the first system, determining whether the first set of one or more merging criteria are satisfied comprises determining whether one or more UAVs in the first swarm and one or more UAVs in the second swarm will come within a threshold minimum distance from one another within a threshold amount of time.

In some embodiments of the first system, the one or more processors comprise: one or more classical processors configured to receive the first state data, cause the transmission of the first respective control signals, receive the second state data, and cause transmission of the second respective control signals; and one or more quantum processors configured to execute at least a portion of the first control algorithm and to execute at least a portion of the second control algorithm.

In some embodiments of the first system, the one or more processors comprise: a set of one or more central processors configured to execute the first control algorithm and cause transmission of the first respective control signals to the swarm-leader UAVs; and a set of one or more swarm-specific processors configured to execute the second control algorithm and cause transmission of the second respective control signals to UAVs in the first set.

In some embodiments of the first system: the set of one or more swarm-specific processors is disposed onboard a swarm-leader UAV for the first swarm; and transmission of the second respective control signals to UAVs in the first set is transmitted from the swarm-leader UAV for the first swarm.

In some embodiments of the first system: transmission of the first respective control signals to the swarm-leader UAVs is performed as part of a first series of control signal transmissions having a first latency; and transmission of the second respective control signals to the UAVs in the first set is performed as part of a second series of control signal transmissions having a second latency lower than a first latency.

In some embodiments of the first system, the one or more processors are configured to: control navigation of the swarm-leader UAVs in accordance with the first respective control signals; and control navigation of the UAVs in the first set in accordance with the second respective control signals.

In some embodiments, a first method, for unmanned aerial vehicle (UAV) control, is provided, the first method performed at a system comprising one or more processors and a plurality of UAVs, wherein the plurality of UAVs is divided into a plurality of respective UAV swarms, each UAV swarm comprising a respective subset of the plurality of UAVs, each subset including a respective swarm-leader UAV, the first method comprising: receiving first state data specifying respective position data and respective heading data corresponding to each of the swarm-leader UAVs; executing a first control algorithm configured to determine first respective navigation instructions for each of the respective swarm-leader UAVs, based on the first state data, to navigate each of the respective swarm-leader UAVs toward a respective destination and to avoid confliction with the other swarms; causing transmission of first respective control signals to the swarm-leader UAVs, wherein the respective control signals indicate the first respective navigation instructions for the respective swarm-leader UAV; receiving second state data specifying respective position data and respective heading data corresponding to each UAV of a first set of UAVs, wherein the first set of UAVs comprise UAVs in a first swarm of the plurality of respective UAV swarms; executing a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and causing transmission of second respective control signals to UAVs in the first set, wherein the second respective control signals indicate the second respective navigation instructions for the respective UAVs in the first set.

In some embodiments, a first non-transitory computer-readable storage medium, storing instructions for unmanned aerial vehicle (UAV) control, is provided, the instructions configured to be executed by one or more processors of a system comprising a plurality of UAVs, wherein the plurality of UAVs is divided into a plurality of respective UAV swarms, each UAV swarm comprising a respective subset of the plurality of UAVs, each subset including a respective swarm-leader UAV, wherein the instructions are configured such that execution of the instructions causes the system to: receive first state data specifying respective position data and respective heading data corresponding to each of the swarm-leader UAVs; execute a first control algorithm configured to determine first respective navigation instructions for each of the respective swarm-leader UAVs, based on the first state data, to navigate each of the respective swarm-leader UAVs toward a respective destination and to avoid confliction with the other swarms; cause transmission of first respective control signals to the swarm-leader UAVs, wherein the respective control signals indicate the first respective navigation instructions for the respective swarm-leader UAV; receive second state data specifying respective position data and respective heading data corresponding to each UAV of a first set of UAVs, wherein the first set of UAVs comprise UAVs in a first swarm of the plurality of respective UAV swarms; execute a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and cause transmission of second respective control signals to UAVs in the first set, wherein the second respective control signals indicate the second respective navigation instructions for the respective UAVs in the first set.

In some embodiments, a first swarm-leader unmanned aerial vehicle (UAV), disposed in a system for swarm-based UAV control, is provided, wherein the first swarm-leader UAV comprises one or more processors configured to: receive swarm-member UAV state data for a plurality of swarm-member UAVs, wherein the plurality of swarm-member UAVs are members of a UAV swarm associated with the swarm-leader UAV, and wherein the swarm-member UAV state data specifies respective position data and respective heading data corresponding to each of the plurality of swarm-member UAVs; determine, based on a swarm-member UAV control algorithm applied to the received swarm-member UAV state data, respective navigation instructions for each of the plurality of swarm-member UAVs, wherein the respective navigation instructions are configured to navigate each of the plurality of swarm-member UAVs toward the swarm-leader UAV and to avoid confliction amongst the plurality of swarm-member UAVs; and cause transmission of respective swarm-member UAV control signals to the plurality of swarm-member UAVs, wherein the swarm-member UAV control signals indicate the respective navigation instructions for the plurality of swarm-member UAVs.

In some embodiments of the first swarm-leader UAV, the one or more processors are configured to control navigation of the swarm-member UAVs in accordance with the swarm-member UAV control signals indicating the respective navigation instructions for the plurality of swarm-member UAVs.

In some embodiments of the first swarm-leader UAV, determining the respective navigation instructions for each of the plurality of swarm-member UAVs comprises one or more of the following: (1) transmitting the received swarm-member UAV state data to a central processing system configured to execute the swarm-member UAV control algorithm, and receiving from the central processing system the respective navigation instructions for the plurality of swarm-member UAVs; and (2) executing the swarm-member UAV control algorithm locally at the swarm-leader UAV to generate the respective navigation instructions for the plurality of swarm-member UAVs.

In some embodiments of the first swarm-leader UAV, the one or more processors are configured to: transmit swarm-leader UAV state data to a central processing system, wherein the swarm-leader UAV state data specifies position data and heading data for the swarm-leader UAV, wherein the central processing system is configured to execute a swarm-leader UAV control algorithm that uses the swarm-leader state data, along with state data for other swarm-leader UAVs associated with different UAV swarms, to determine respective navigation instructions for the swarm-leader UAV and for each of the other swarm-leader UAVs, wherein the respective navigation instructions for the swarm-leader UAV and for each of the other swarm-leader UAVs are configured to navigate the swarm-leader UAV toward a respective associated destination, to navigate the other swarm-leader UAVs toward other respective associated destinations, and to avoid confliction between the swarm associated with the swarm-leader UAV and the different UAV swarms associated with the other swarm-leader UAVs; and receive, from the central processing system, a swarm-leader UAV control signal indicating the navigation instructions for the swarm-leader UAV.

In some embodiments of the first swarm-leader UAV, the one or more processors are configured to control navigation of the swarm-leader UAV in accordance with swarm-leader UAV control signal indicating the navigation instructions for the swarm-leader UAV. In some embodiments, a second method, for swarm-based unmanned aerial vehicle (UAV) control, is provided, the second method performed at a swarm-leader UAV, wherein the swarm-leader UAV comprises one or more processors, the second method comprising: receive swarm-member UAV state data for a plurality of swarm-member UAVs, wherein the swarm-member UAVs are members of a UAV swarm associated with the swarm-leader UAV, and wherein the swarm-member UAV state data specifies respective position data and respective heading data corresponding to each of the plurality of swarm-member UAVs; determine, based on a swarm-member UAV control algorithm applied to the received swarm-member UAV state data, respective navigation instructions for each of the plurality of swarm-member UAVs, wherein the respective navigation instructions are configured to navigate each of the plurality of swarm-member UAVs toward the swarm-leader UAV and to avoid confliction amongst the plurality of swarm-member UAVs; and cause transmission of respective swarm-member UAV control signals to the plurality of swarm-member UAVs, wherein the swarm-member UAV control signals indicate the respective navigation instructions for the plurality of swarm-member UAVs. In some embodiments, a second non-transitory computer-readable storage medium, storing instructions for swarm-based unmanned aerial vehicle (UAV) control, is provided, the instructions configured to be executed by one or more processors of a swarm-leader UAV, wherein the instructions are configured such that execution of the instructions causes the swarm-leader UAV to: receive swarm-member UAV state data for a plurality of swarm-member UAVs, wherein the swarm-member UAVs are members of a UAV swarm associated with the swarm-leader UAV, and wherein the swarm-member UAV state data specifies respective position data and respective heading data corresponding to each of the plurality of swarm-member UAVs; determine, based on a swarm-member UAV control algorithm applied to the received swarm-member UAV state data, respective navigation instructions for each of the plurality of swarm-member UAVs, wherein the respective navigation instructions are configured to navigate each of the plurality of swarm-member UAVs toward the swarm-leader UAV and to avoid confliction amongst the plurality of swarm-member UAVs; and cause transmission of respective swarm-member UAV control signals to the plurality of swarm-member UAVs, wherein the swarm-member UAV control signals indicate the respective navigation instructions for the plurality of swarm-member UAVs.

In some embodiments, any one or more of the characteristics of any one or more of the systems, methods, UAVs, and/or computer-readable storage mediums recited above may be combined, in whole or in part, with one another and/or with any other features or characteristics described elsewhere herein.

BRIEF DESCRIPTION OF THE FIGURES

The patent or application file contains at least one drawing executed in color. Copies of this patent or patent application publication with color drawings will be provided by the office upon request and payment of the necessary fee.

DETAILED DESCRIPTION

Figure 1:
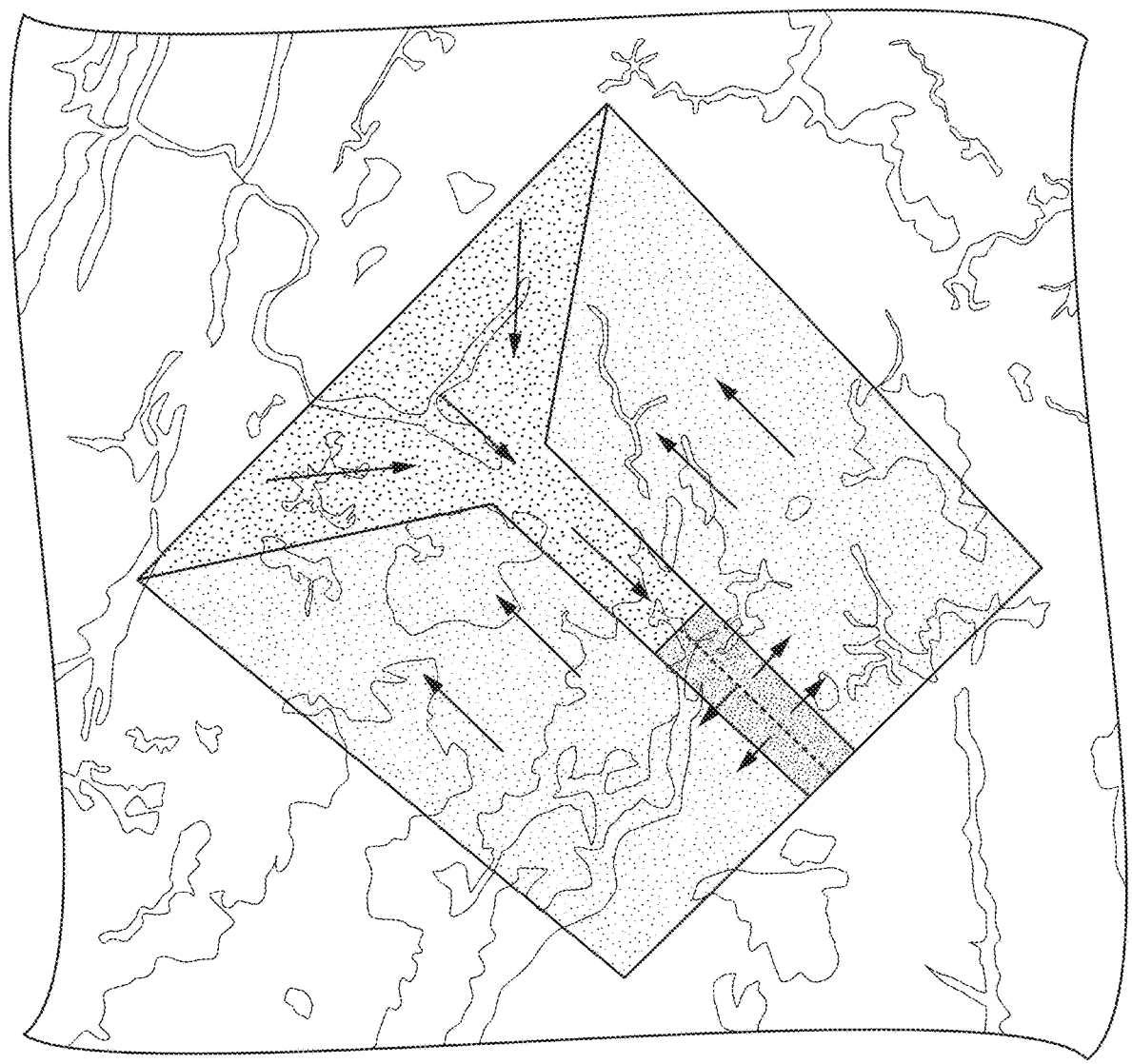
FIG. 1 depicts areas in which different behavioral constraints are imposed on aircraft around an airport runway, in accordance with some embodiments.

Described herein are exemplary embodiments of systems and methods for hierarchical swarm-based 4D UAV path planning, which may address the problems and shortcomings of known aircraft and UAV control systems and methods described above.

Path Planning and Deconfliction for UAVs

The systems disclosed herein may leverage one or more algorithms for localized 4D path planning in high-occupancy, constrained airspace. In some embodiments, the path planning algorithms applied may model attraction and repulsion. Attraction is a mechanism that keeps a UAV headed towards its respective destination, while repulsion is a mechanism that keeps a UAV from colliding with other UAVs (or from colliding with other objects, such as environmental obstacles such as buildings). Using these mechanisms, path planning algorithms may be able to drive UAVs to their destinations and keep UAVs safely separated while self-generating non-trivial temporospatial operations such as: holding patterns, diverting routes, and interleaving flights.

In some embodiments, the systems and methods disclosed herein may leverage quantum annealing to enable an iterative path planning technique and algorithm that involves both classical and quantum computation components. The classical component can use one or more processors of a classical computing system to calculate the distances between UAVs and possible paths for UAVs from a set of new, possible properties, such as UAV location. The quantum component can use one or more processors of a quantum computing system to select from the new, possible properties to minimize the distance of the UAV to a target/destination (e.g., the location of the destination) while ensuring adequate separation between UAVs. In some embodiments, one or more minimizations performed during execution of the techniques/computations disclosed herein may be performed in fewer time-steps (e.g., in a single time step) by a quantum computing system than is possible in a classical computer implementation.

By using both classical and quantum computation components, the flight trajectories for multiple UAVs flying to a common destination or to multiple destinations may be optimized while the separation distance between the UAVs may be maintained. The algorithm can utilize qubits to represent maneuverability options for a UAV. The maneuverability options may be partitioned into a set of multiple qubits per UAV. Each set may include a plurality of qubits that are representative of the maneuverability options.

The algorithm can utilize QUBO to find the lowest cost-energy maneuverability option (e.g., from among multiple maneuverability options). By increasing the number of maneuverability options, conflicts may be reduced and delays to schedules (e.g., delays to or to one or more segments of a schedule, such as delays in clearance for landing) may be minimized.

In some embodiments, the optimization may occur within the context of fewer than all (e.g., a single) iterations. By optimizing over fewer than all iterations, the number of computations may be reduced. In some embodiments, the optimization results may be enhanced by integrating the distance-to-target variable directly within the Q matrix. For example, the distance-to-target may be taken into account at each iteration, rather than as part of an optimization including the entire path. The techniques disclosed herein may differ in this way from, for instance, a discrete graph approach.

Additionally or alternatively, in some embodiments, UAV properties (e.g., dynamics) may be determined implicitly in the quantum formulation. In some instances, the algorithm can place restrictions to the individual maneuverability options, also referred to as sub options. In some embodiments, the number of qubits may be the limiter for the granularity of maneuvers.

In some embodiments, a path planning algorithm may be configured to drive all aircraft, x, to their respective destinations, y, using control, u. At each iteration, k, the algorithm may attempt to find a control that brings the aircraft closer to their destinations while maintaining adequate separation between the aircraft.

Let f (x, u) be the effect of applying control, u, to aircraft state, x, at a given iteration. At the conclusion of each temporal iteration, aircraft dynamics may be updated based on the selected controls:

$$x^{k+1} - x^k = f(x^k, u^k) \qquad (1)$$

Table I shows variables in this formulation:

TABLE 1

Aircraft Control Variables

| Symbol | Meaning |
| --- | --- |
| x | aircraft dynamic properties (e.g., position, velocity) |
| u | aircraft controls |
| y | aircraft destinations |
| k | temporal iteration counter |
| N | number of aircraft |
| n | craft id, n ∈ 1 . . . N |
| $x_n$ | individual aircraft |
| $y_n$ | individual aircraft destinations |
| $u_n$ | individual aircraft controls |

The path planning algorithm may be configured to select a maneuverability option for each temporal iteration. The algorithm may utilize QUBO to find a lowest cost-energy maneuverability option (e.g., from among multiple maneuverability options). Throughout this description of the algorithms and systems disclosed herein, it may be assumed that all operations described are occurring within the context of a single iteration unless the iteration variable, k, is explicitly referenced.

The path planning algorithm may be similar to that of discrete time optimal control, namely:

$$\min_u \left( |x^K - y^K| + \sum_{k=0}^{K} Q(x^k, u^k) \right)$$

where $$x^{k+1} - x^k = f(x^k, u^k)$$

However, the implementation herein may, in some embodiments, consider only considering instantaneous optimization, focusing on local effects. Therefore, the algorithm may not (necessarily) provide a globally optimal path. Moreover, there is a risk that aircraft may not reach their destinations as the scope of scenario expands. Thus, optimality in the standard optimal control may be considered over all iterations; whereas, in the systems and methods disclosed herein, optimization may be performed only per iteration. Furthermore, final distance to target may be represented as a separate term in an optimal control cost function; whereas, in the systems and methods disclosed herein, distance-to-destination may be integrated directly within the iterative steps.

For the optimizing component of the computation, the systems and methods disclosed herein may utilize Quadratic Unconstrained Binary Optimization (QUBO), that is:

$$\min_{u_i \in 0,1} u^T Q(x) u$$

where the terms are defined in Table 2.

TABLE 2

Control Qubits

| Symbol | Meaning |
| --- | --- |
| B | number of qubits per aircraft control |
| b | subcontrol, $b \in 1 \ldots B$ |
| $u_{nb}$ | subcontrol b for aircraft n |
| $x_{nb}$ | result of applying control $u_{nb}$ to $x_n$ |

QUBO is in a class of optimization problems amenable to annealing computation and has been applied to various transportation optimization problems. To compute the QUBO for the purposes of path planning algorithm(s) applied herein, qbsolv may be used. Qbsolv is a tool qbsolv for use in quantum annealing optimization problems that may be executed on either a quantum processor (e.g., the DWave quantum architecture) or on a conventional (classical) processor.

To configure the aircraft/UAV path planning problem into QUBO form, the system may subdivide aircraft controls, $u_n$, into B qubits per craft. These qubits may determine the changes to the aircraft dynamics, for instance: heading, speed, and ascent. The total number of qubits in the control vector, u, may be BN: the number of aircraft multiplied by the number of bits in the individual control vectors. The discrete options for $u_n$ may determine the discrete possibilities for the future positions and dynamics of the aircraft. The total dimension of the QUBO may also be BN.

Note that within a given iteration, the aircraft attributes, x, may be static and not variable within the QUBO minimization. Conversely, the binary controls, u, may hold the qubits and may be variable. Also note that the dimension of x may not affect the dimensionality of Q, but only the content of Q.

The system may seek to minimize the distances to the destinations while maintaining adequate aircraft separation. To this end, let d(x) represent the distance between an aircraft and its destination. The distance-to-destination-cost, $Q_a$, may be represented as:

$$u^T Q_a(x) u := \sum_n^N \sum_b^B d(x_{nb}) u_{nb}^2$$

For maintaining separation, the algorithm may model repulsion, the cost of aircraft getting too close together. The repulsion function, r, may vary inversely with distance and may thus be included in the minimizer. As an example repulsor, the following may be used:

$$r(d)=1/d$$

Specific repulsion functions may behave similarly but may vary depending on the nature of the use case. The intercraft repulsion-cost, $Q_r$, may be defined as:

$$u^T Q_r(x) u := \sum_{m,n}^N \sum_{i,j}^B r(x_{ni}, x_{mj}) u_{ni} u_{mj}$$

The total QUBO may thus be defined as:

$$u^T (Q_a + Q_r)(x) u$$

In some embodiments, UAV path planning (either for an individual UAV or for a UAV swarm) may be performed in accordance with any of the techniques described in U.S. patent application Ser. No. 16/720,906, filed Dec. 19, 2019, the entire contents of which is hereby incorporated by reference.

UAV Path Planning and Deconfliction Examples

Example 1—Aircraft Landing Patterns

In one example, the path planning algorithms described herein may be used to plan paths for multiple conventional aircraft landing onto a common runway. Managing the successful landing of these aircraft may involve subtle speed adjustments or more significant corrections such as entering a holding pattern.

To establish the final runway approach and adhere to normal airport traffic flow, spatial constraints around the airport may be added. In FIG. 1 the overlay colors represent different behavioral areas: red areas direct aircraft therein away from the airport; blue areas direct aircraft therein around the airport, parallel to the target runway; and green areas allow final approach and provide no additional constraints. Functionally, these areas form a vector field around the airport. The areas may be implemented as additional attractors within the algorithms otherwise described herein. In this case, the attractors may attract aircraft not to specific target points but toward particular headings while in specific areas.

In this example, aircraft are placed around the airport with dynamic constraints (e.g., cruise speed, turning rate, climbing speed) as shown in Table III.

TABLE 3

Conventional Aircraft Constraints

| Bound | Property | Value |
|---|---|---|
| min | cruise speed | 200 kn |
| min | descent speed | 90 kn |
| min | separation | 5 nm |
| norm | cruise speed | 220 kn |
| norm | descent speed | 120 kn |
| max | cruise speed | 250 kn |
| max | descent speed | 140 kn |
| max | descent | 2500 ft/minute |
| max | turning rate | 3 degrees/sec |

Figure 2:
FIG. 2 depicts flight paths produced by applying a path planning algorithm, in accordance with some embodiments.
Figure 3:
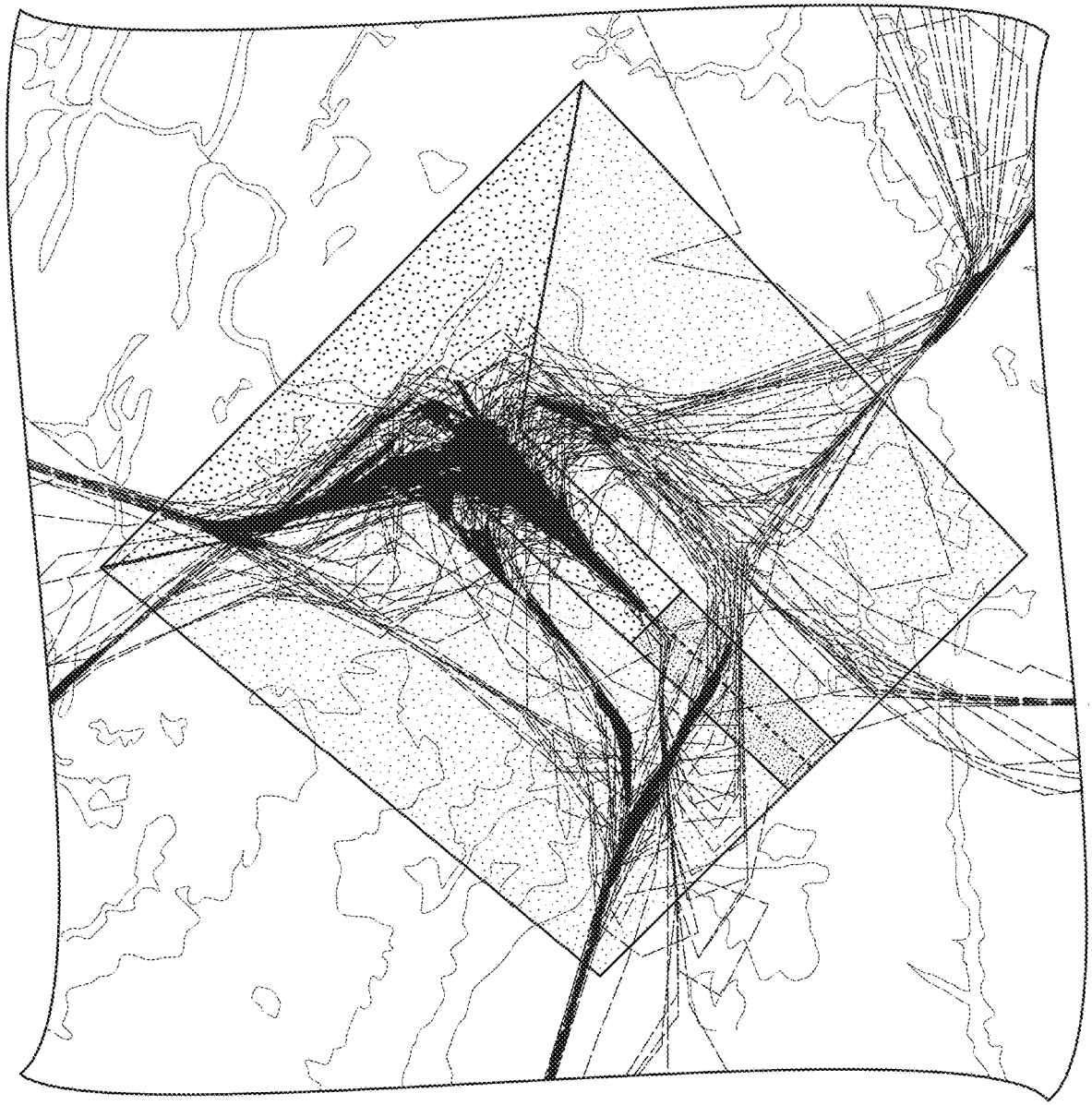
FIG. 3 depicts historic flight paths at KIAD airport, in accordance with some embodiments.

The result of then applying the path planning algorithm described herein, as shown in FIG. 2, produces patterns akin to Standard Terminal Arrival Routes (STARS). Note that, unlike STARS, these landing patterns are not created by predefined routes, but by area constraints and the underlying aircraft dynamics. Also note the appearance of holding patterns. These holding patterns are created when multiple aircraft attempt to land simultaneously. Due to their separation constraints, only one aircraft will be able to land at a time; the others will be forced off their landing approaches and will reattempt to land, perhaps multiple times. As can be seen by comparison to FIG. 3, which shows historic arrivals to KIAD airport, the algorithms provided herein provide a reasonable proxy for historic airport operations at this airport.

Figure 4:
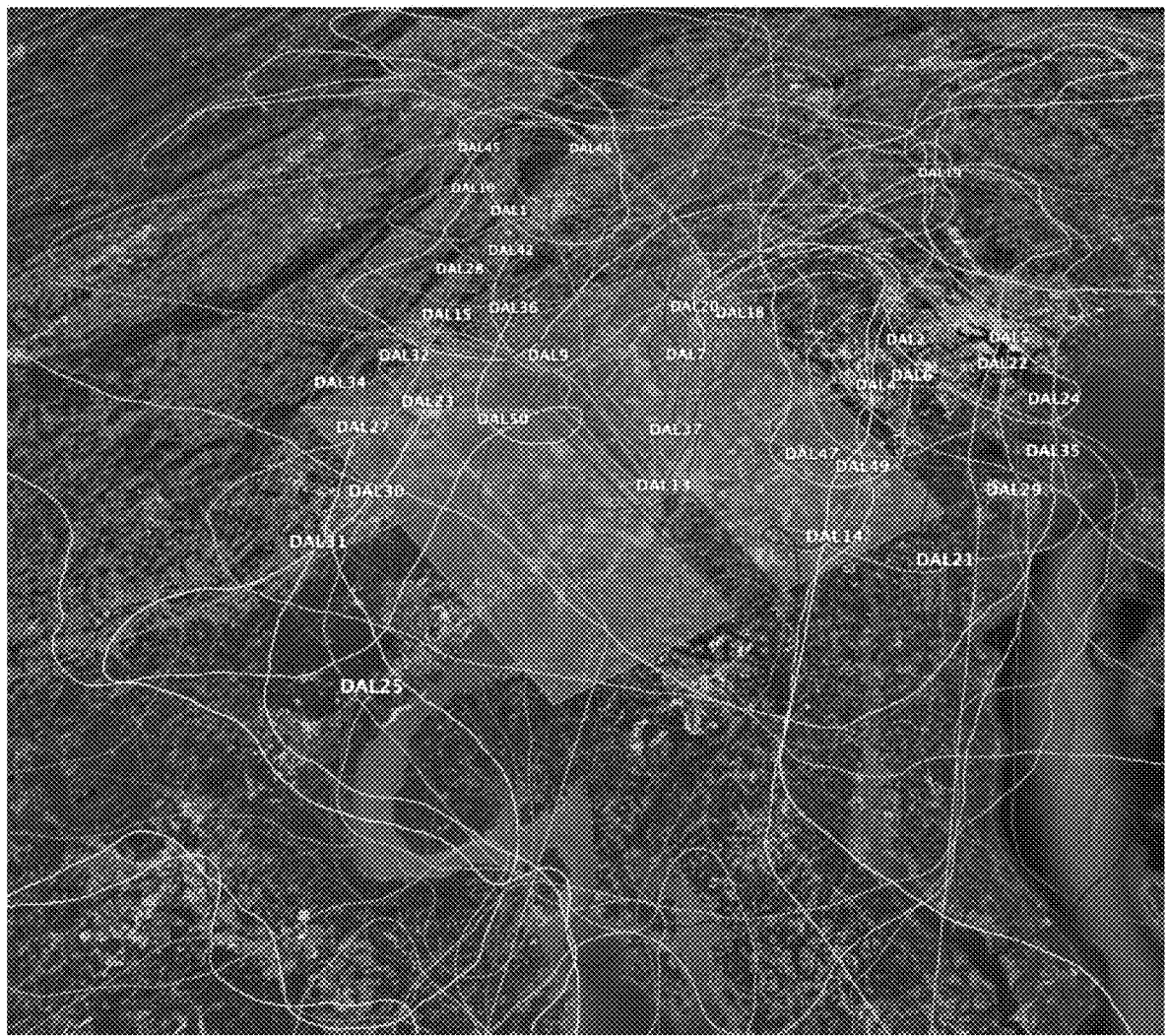
FIG. 4 depicts flight paths produced by applying a path planning algorithm, in accordance with some embodiments.

When increasing the separation requirements or adding aircraft past a critical threshold for the airspace, chaotic patterns may arise, as shown for example in FIG. 4. In FIG. 4, the repulsive forces coupled with the airport constraints prevent aircraft from successfully establishing final approaches as they are alternately attracted to the airport and repulsed by the other craft near the airport.

Example 2—Rogue UAV in Drone Highway

High-mobility UAVs (e.g. quadcopters) may have considerably greater degrees of freedom (for instance, they may stop in mid-air) than conventional aircraft, and thus may generate more irregular paths as compared to conventional aircrafts.

Figure 5:
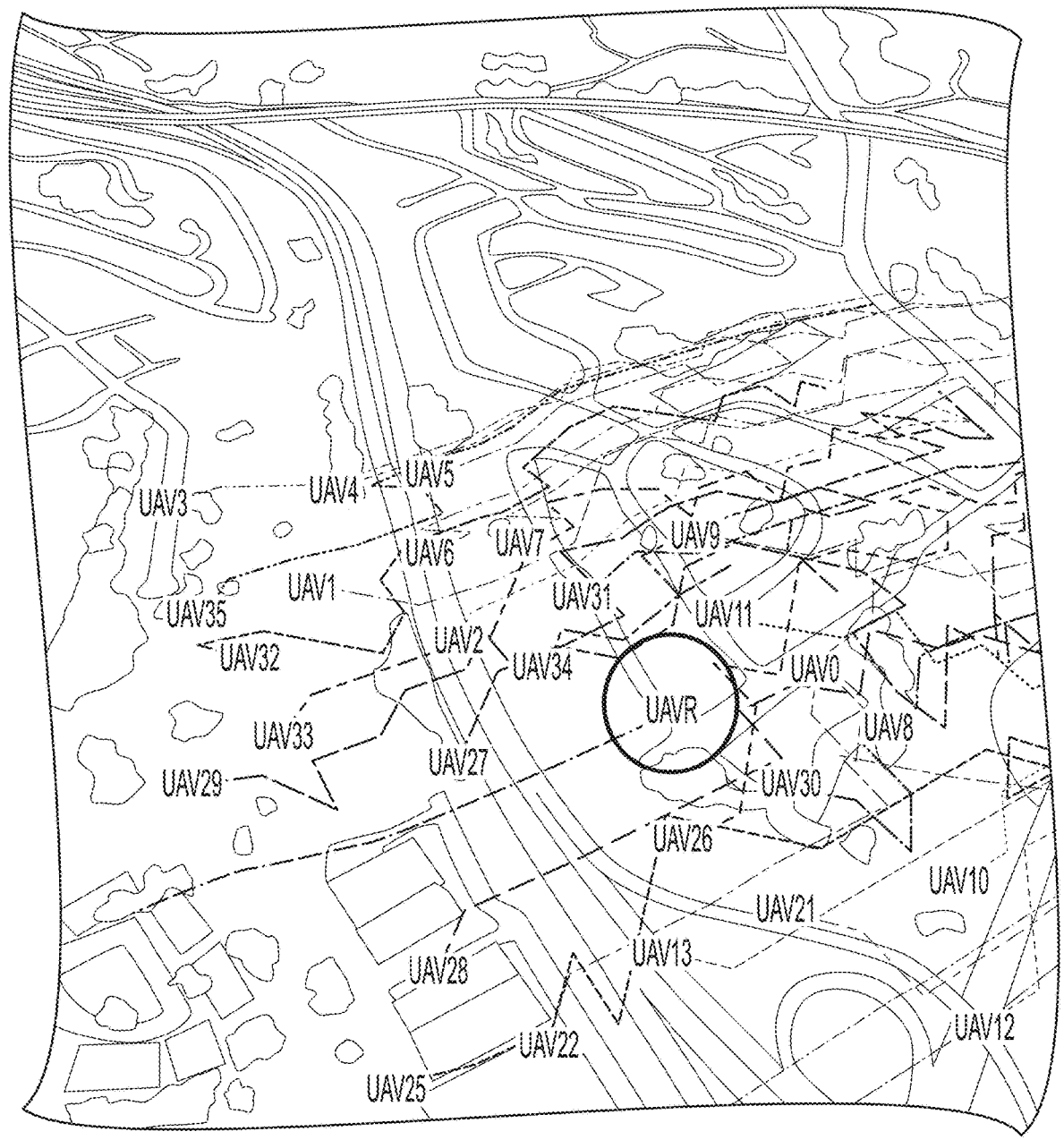
FIGS. 5-6 depict flight paths for UAVs produced by applying a path planning algorithm, in accordance with some embodiments.
Figure 6:
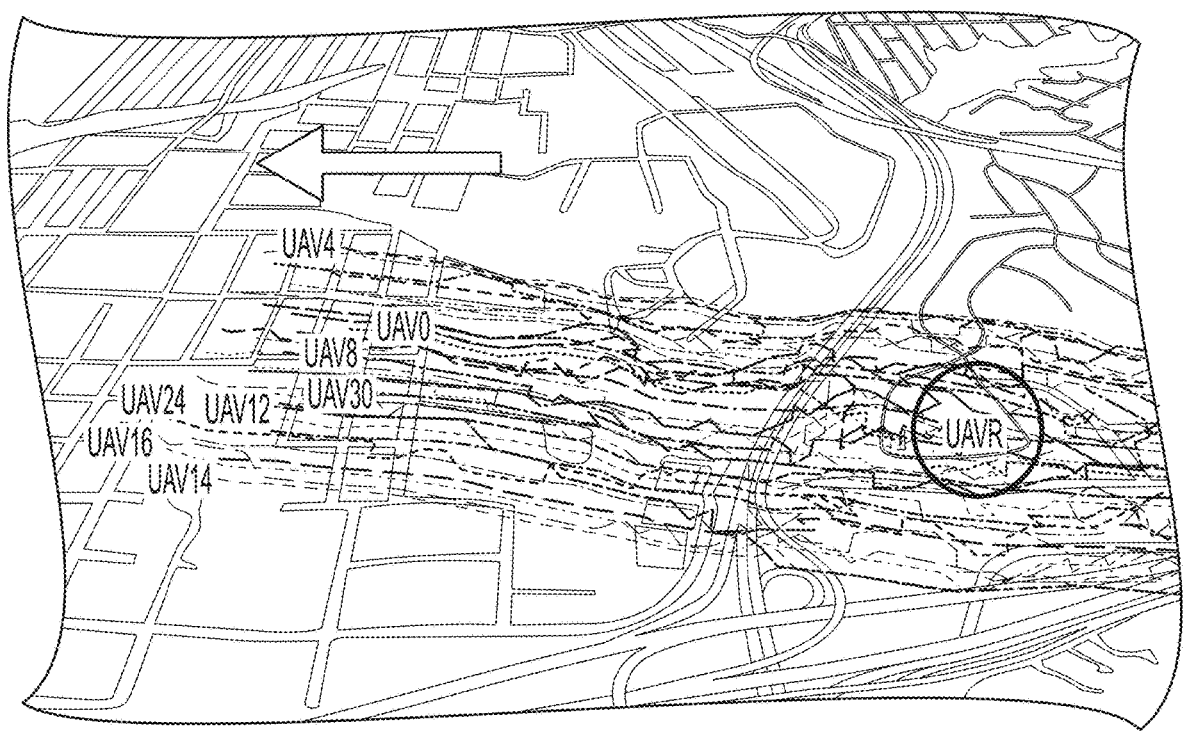

In FIG. 5, an example is shown of a number of UAVs heading along a common path: a "Drone Highway." As the UAVs encounter a rogue UAV, labeled "UAVR" in FIG. 5, the UAVs make abrupt adjustments in heading, altitude, and speed, in accordance with the path planning algorithms described herein. As the UAVs make these adjustments, the algorithm accounts for separation between the UAVs, resulting in the jagged paths seen during the disruption. As the disturbance passes as the group of UAVs moves past the rogue UAV, as shown in FIG. 6, the path planning algorithm causes the UAV movements return to more stable behaviors as they proceed along their common path.

Example 3—Drone Demolition Derby

In this example of an application the algorithm described herein, a group of UAVs are equidistant from a single point and all on a heading towards the single point. That is, each of the UAVs intends to head directly toward the point, pass through it, and end up the same distance from the point, but in the other direction. Barring evasive maneuvers, each of the UAVs would end up in a midair pileup. Fortunately, the algorithm provided herein allows for successful maneuvers.

Figure 7:
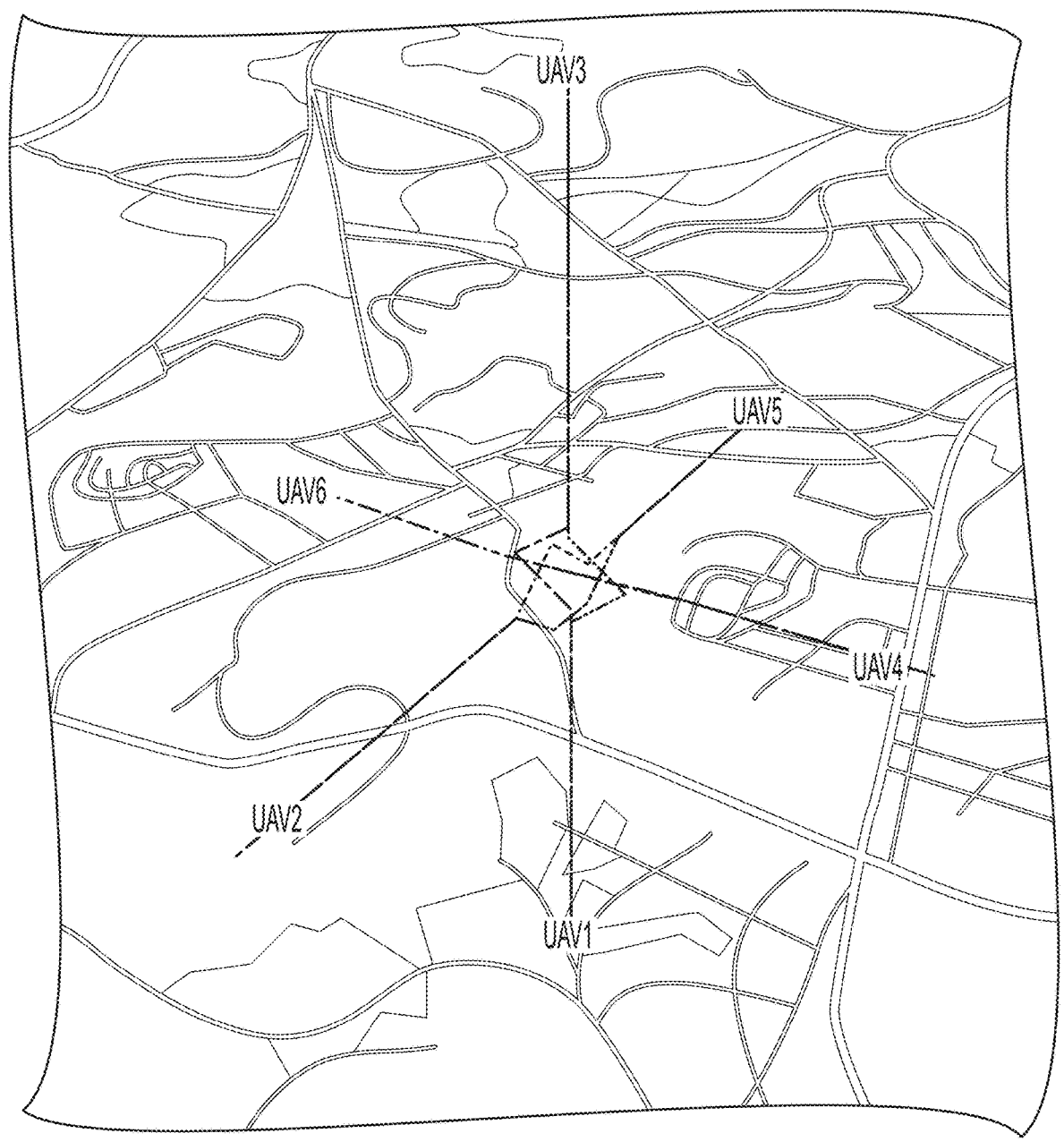
FIG. 7 depicts flight paths for UAVs produced by applying a path planning algorithm, in accordance with some embodiments.

In an example of six UAVs in this arrangement, each of the six UAVs are initially positioned on a separate face of an invisible cube. As shown in FIG. 7, the algorithm described herein causes each of the six UAVs to travel toward the center location, and to then divert their paths to dodge one another and safely navigate to other side of the cube. In an example of 50 UAVs in this arrangement, each of the fifty UAVs are initially positioned on the surface of an invisible sphere.

Figure 8:
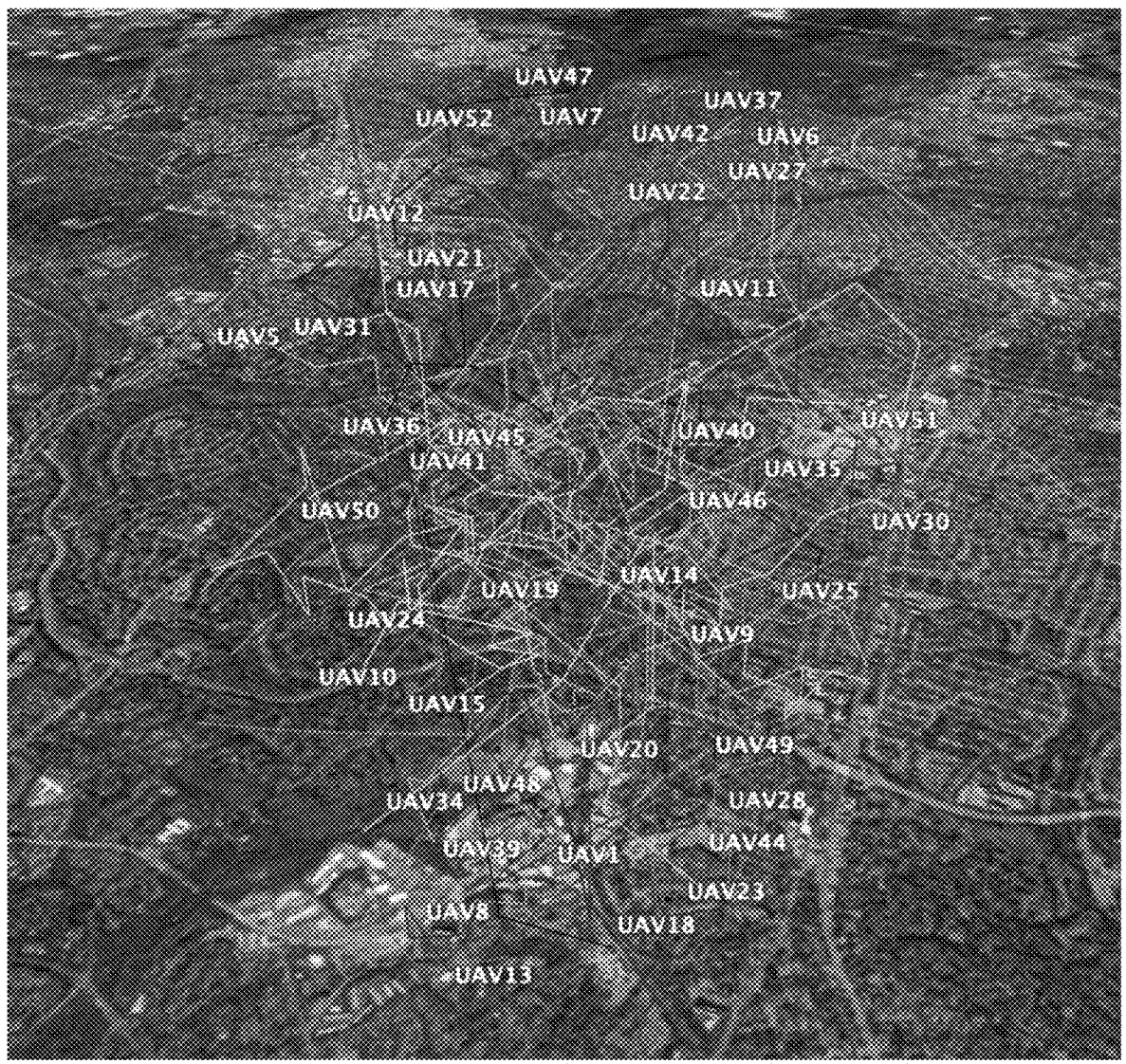
FIG. 8 depicts flight paths for UAVs produced by applying a path planning algorithm, in accordance with some embodiments.

As shown in FIG. 8, more complex movements are created with a larger number of UAVs, but the overall effect is the same: all UAVs navigate the confluence, maintain adequate separation at all times, and safely reach the other side of the sphere.

Path Planning and Deconfliction for UAV Swarms

While positive control is possible (if challenging) for individual conventional aircraft (according, e.g., to the techniques described above), such granularity of control over UAVs may, in some embodiments, be neither practical nor useful. Given the variety, agility, and potentially large number of UAVs entering an airspace, other approaches are needed.

Accordingly, a system may be configured, as described in detail below, to divide the control into two logical (e.g., hierarchical) levels: (1) control of groups, or swarms, of UAVs, and (2) control of individual UAVs within swarms.

The group control component may provide "macro" guidance for UAV traffic that seeks to minimizing conflicts between pairs of swarms (e.g., by causing one or more UAVs within separate swarms and/or one or more swarm-leader UAVs for a swarm to repulse from one another) while steering all swarms to their respective destinations. The individual control component may then provide individual UAV management, including preventing collisions between individual pairs of UAVs as well as urban structures. In addition to providing computational flexibility, subdividing the system can aid in functional flexibility. By differentiating swarms from their constituent UAVs, the system may be better able to vary the nature of the control over swarms and individual drones.

Figure 9:
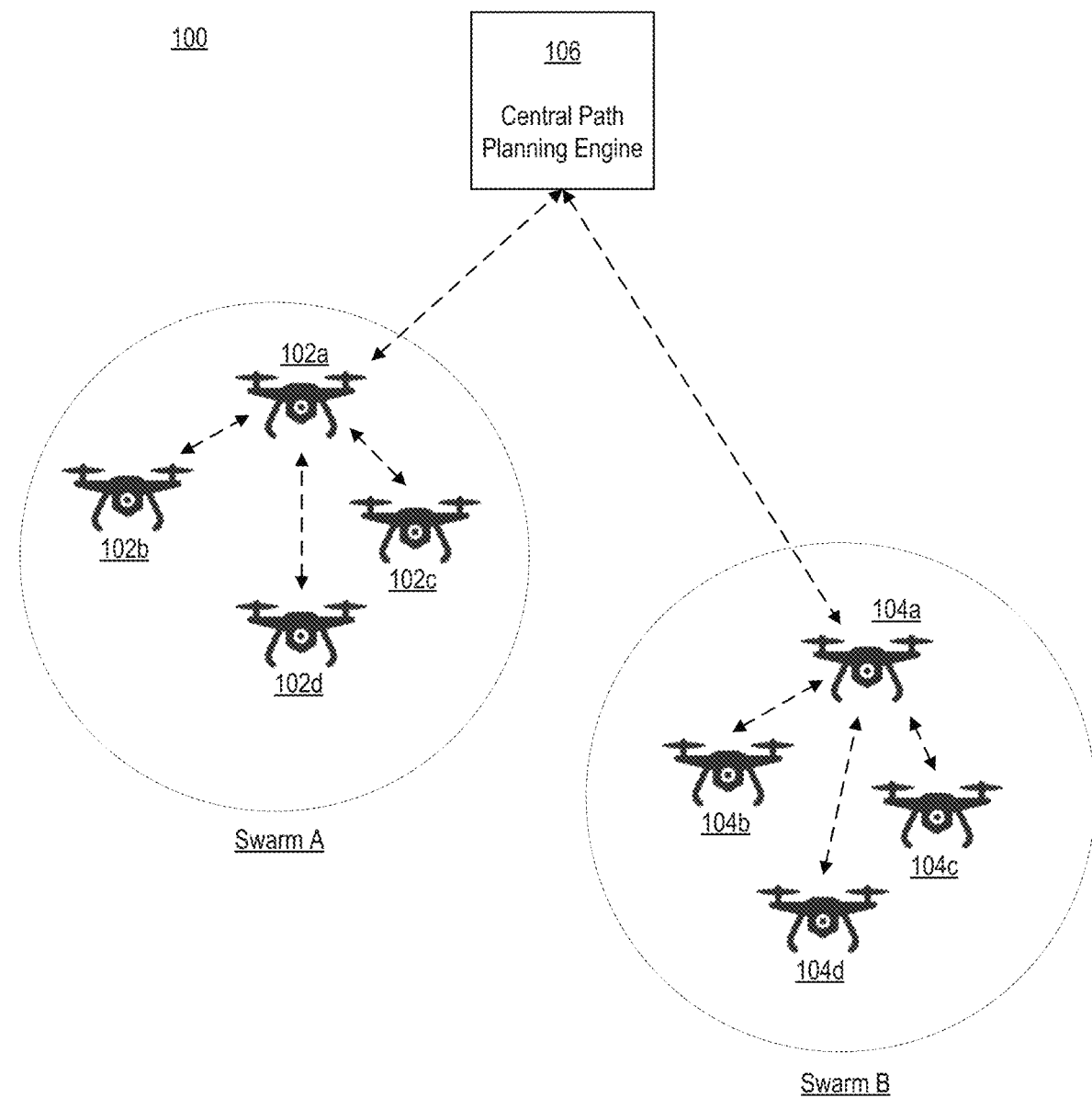
FIG. 9 depicts a schematic diagram of a system for UAV swarm control, in accordance with some embodiments.

FIG. 9 shows system 100 for controlling a plurality of UAVs arranged into a plurality of swarms, in accordance with some embodiments. As shown, system 100 may include a plurality of UAVs 102a-d and 104a-d. While the example of system 100 shows eight UAVs, any suitable number of UAVs may be included in such a system, such as hundreds, thousands, or tens of thousands of UAVs (or more). In the example shown in FIG. 9, UAVs 102a-d are included in Swarm A, while UAVs 104a-d are included in Swarm B. In the example shown swarm membership is non-overlapping. In some embodiments, swarm membership may be predefined according to device settings, user inputs, and/or device configurations set before deployment. In some embodiments, swarm membership may be dynamically determined according to one or more logical rules applied by the system, such that the system can automatically arrange a plurality of UAVs into a plurality of swarms, for example depending on UAV position (e.g., proximity), UAV destination, UAV heading, UAV type, UAV capabilities, and/or other considerations.

UAVs in system 100 may include any computerized devices configured to participate in system 100 by using one or more sensors to detect characteristics of the respective UAV, such as the location (e.g., longitude, latitude, altitude), orientation (e.g., cardinal orientation, heading, pitch, yaw, roll), speed (e.g., air-speed, ground-speed), and/or acceleration (e.g., thrust) of the respective UAV. In some embodiments, the one or more sensors may be configured to detect characteristics that may include any derivatives (of any order) of any of the characteristics of the respective UAVs. The computerized devices in the UAVs may be configured to communicate (e.g., transmit and receive data) with engine 106 via one or more transceivers, including to transmit information from the aircraft to engine 106 regarding the characteristics of the aircraft. The transceiver(s) may utilize communication protocols in order to transmit and receive control signals included in the communicated data to and from engine 106. Each of the computerized devices in the UAVs may comprise one or more processors configured to control the sensor(s) and transceivers. The computerized devices in the UAVs may also be configured to control navigation (e.g., to control acceleration, deceleration, and steering) of the respective UAV using information from the respective control signals. Exemplary controls may include, but are not limited to, heading (e.g., steering, angle, turning rate), speed, acceleration, and altitude.

As shown in FIG. 9, each swarm may include a swarm-leader UAV. In the example shown, UAV 102a is the swarm-leader UAV for Swarm A, and UAV 104a is the swarm-leader UAV for Swarm B.

The swarm-leader UAV may be configured to serve one or more unique roles in its swarm, including, in some embodiments, being responsible for communication with a central path planning engine, with other UAVs in the swarm, and/or with other UAVs in other swarms (including other swarm-leader UAVs). In the example of system 100, swarm-leader UAVs 102a and 104a are configured to communicate (e.g., by any suitable wireless network communication protocol) with central path planning engine 106, which may include one or more classical computing systems (e.g., remote servers) and/or one or more quantum computing systems. In some embodiments, central path planning engine 106 may be a classical computing system, a quantum computing system, a hybrid quantum-classical computing system, or may be comprised of one or more computing systems that has access to one or more quantum computing system. For example, the quantum computing system may be a D-Wave computer. In some embodiments, the quantum computing system (e.g., the D-wave computer) may be accessed and controlled remotely for execution of quantum computations by the quantum computing system. In some embodiments, the quantum computing system can be capable of storing and encoding quantum bits and a large number of combinations of states, leading to significantly reduced computation times.

Swarm-leader UAVs 102a and 104a are further configured to communicate (e.g., by any suitable wireless network communication protocol) with other UAVs in the respective swarm of the swarm-leader UAV. In some embodiments, each UAV within a swarm may be configured to communicate directly with any or all other UAVs in the swarm; in some arrangements, UAVs in a swarm may be configured to only communicate with the swarm-leader UAV.

In some embodiments, all UAVs in a swarm may be configured to send and/or receive information directly to and from one or more other UAVs in the swarm and/or outside the swarm. UAVs in the system may identify themselves to one another and may be aware as to whether other UAVs are or are not members of the same swarm. In some embodiments, inter-UAV communication may be localized, such that (whether said communication is performed directly or indirectly (e.g., via one or more "hops")), such that UA's that are greater than a certain distance from one another do not communicate with one another. In some embodiment, communication localization may consider one or more additional factors, such as UAV speed and/or heading.

In some embodiments, communications between UAVs within a swarm may have a lower latency (e.g., half the latency) compared to communications between UAVs in different swarms. This may be due to the fact that communications between UAVs in different swarms may require additional communication hops, for example if all communications are routed through swarm-leader UAVs and/or through a central system. In some embodiments, one or more techniques may be applied to attempt to account for and/or compensate for inherently greater delays for inter-swarm communication. For example, UAVs from different swarms may maintain a greater spatial buffer between one another to account for the longer amount of time it may take for messages between the swarms to be exchanged such that the UAVs from different swarms can be deconflicted.

Table 4, below, shows a list of numerical assumptions that may be applicable to certain embodiments of the systems and methods described herein. The intra-swarm latency shown in Table 4 is a conservative estimate of latency for Dedicated Short Range Communications (DSRC). DSRC is one technique for UAV communications, especially in the context of UAV Traffic Management (UTM).

TABLE 4

UAV Constraints

| Qualifier | Measurement | Value |
|---|---|---|
| min | speed | 0 knots (stationary) |
| min | separation | 5 meters |
| intra-swarm | latency | 150 ms |
| inter-swarm | latency | 300 ms |
| max | separation | 7 meters |
| max | speed | 13 knots (24 km/hour) |
| max | descent/ascent | 20 ft/sec |

In some embodiments, swarm-leader UAVs may comprise one or more on-board processor that are configured to control communication with other UAVs in the swarm and/or with a central path planning engine. The one or more processors may additionally be configured to execute, locally on-board the swarm-leader UAV, one or more path planning algorithms, as described herein. In some embodiments, the one or more on-board processors of a swarm-leader UAV may include one or more classical processors and/or one or more quantum processors.

As described herein, system 100 may be configured such that the macro level of path planning is applied to navigate Swarm A and Swarm B toward their overall respective destinations while avoiding confliction with one another (and with other swarms), while a micro level of path planning is applied to navigate individual UAVs within each swarm and to avoid confliction with other individual UAVs. In some embodiments, system 100 may implement this arrangement by applying a first-level path planning algorithm (e.g., consistent with the path planning algorithms described herein above) to plan movements of swarm-leader UAVs 102a and 104b. This first-level path planning algorithm may be configured to drive swarm-leader UAVs 102a and 104b toward their respective destinations and to repulse swarm-leader UAVs 102a and 104b from one another, so as to avoid overall confliction between Swarm A and Swarm B. Meanwhile, system 100 may apply a plurality of second-level path planning algorithms (e.g., each consistent with the path planning algorithms described herein above) to plan movements of individual UAVs within respective swarms, such that UAVs in a respective swarm are each driven towards their respective swarm-leader UAVs and are each repulsed from one another. A separate second-level path planning algorithm may be executed for intra-swarm level "micro" control for each separate swarm. For example, a separate second-level path planning algorithm may be executed for Swarm A and Swarm B in system 100.

In some embodiments, both levels of path planning algorithms may be executed by the same system. For example, both levels of path planning algorithms may be executed centrally, for example by central path planning engine 106 in system 100. Navigation instructions for swarm-leader UAVs 102a and 102b, computed at central path planning engine 106, may then be communicated from central path planning engine 106 to the respective swarm-leader UAVs. Meanwhile, navigation instructions for non-swarm-leader UAVs, also computed at central path planning engine 106, may then be communicated from central path planning engine 106 to the individual UAVs, either through direct communication or through communication via their respective swarm-leader UAVs. In this arrangement, communication of state data (e.g., location, heading, and speed information) for each individual UAV may also be communicated to central path planning engine 106, either directly or through indirect communication using a swarm-leader UAV as an extra "hop" in the communication path, such that central path planning engine 106 can use the received state data as input data for the path planning algorithms.

In some embodiments, the different levels of path planning algorithms may be executed by different systems, or by different components of the same overall system. For example, in some embodiments, the first level of path planning may be performed centrally, while the second level path planning algorithms may be performed locally. For example, one or more locally situated path planning engines, separate from central path planning engine 106, may receive state data regarding individual UAVs in a swarm, execute a path planning algorithm for said UAVs based on the received state data, and transmit the generated navigation instructions to the swarm. In some embodiments, a second level path planning algorithm may be executed by one or more processors disposed directly on the swarm's swarm-leader UAV (or on another UAV within the swarm). In the case of executing the second-level path planning algorithm directly onboard the swarm-leader UAV, a communication hop may be saved, because communications for intra-swarm path planning may require only that individual UAVs upload their state data directly to the swarm-leader UAV and that the swarm-leader UAV then transmits navigation instructions directly to each other UAV in the swarm.

In some embodiments, other suitable computational architectures may be implemented. For example, some or all path planning may be performed using one or more distributed computing systems and/or mesh networks, provided entirely or partially onboard UAVs within a swarm for which the computation is performed. In some embodiments, UAVs in a swarm may be configured to communicate directly with one another, for example to share state data with one another. In some embodiments, additional levels of hierarchy may be implemented within a swarm, such that communication with the swarm-leader UAV may take multiple "hops" across different UAVs in the swarm. In some embodiments, an additional level of path planning may be implemented within a swarm, such that sub-groups of UAVs within the swarm may be defined and localized deconfliction may be performed on an even more granular level using a hierarchical system including three or more levels.

In some embodiments, different UAVs within may have different capabilities and/or different roles. One specific role that has been described herein is the role of swarm-leader UAV. In some embodiments, swarm-leader UAVs may have superior communication capabilities (e.g., higher power, longer range, greater number of bands, more bandwidth, etc.) than other UAVs within the swarm, may have greater processing power than other UAVs within the swarm, may have superior (e.g., more nimble) navigation capabilities than other UAVs within the swarm, and/or may have more sophisticated and/or more numerous sensors than other UAVs within the swarm, may be equipped with lighting devices, and/or may have greater collision tolerance than other UAVs within the swarm.

Another specialized roles that may exist within a UAV swarm is the role of "scout." Scout UAVs may, in some embodiments, have more sophisticated and/or more numerous sensors than other UAVs within the swarm. Scout UAVs may have higher-resolution cameras than other UAVs. In some embodiments, scout UAVs may be configured to provide state data regarding their location, the location of other UAVs, and or data regarding environmental obstacles, to one or more other UAVs in the swarm. Scout UAVs may be configured to transmit data to other UAVs at a higher rate than other transmissions in the system.

Another specialized role that may exist within a UAV swarm is the role of "boxcar." A boxcar UAV may be capable of carrying heavy loads. In some embodiments, a boxcar UAV may be less nimble than other UAVs in the swarm.

In some embodiments, second-level path planning algorithms may be configured to account for different capabilities and/or different roles of UAVs in the swarm when planning paths and generating navigation instructions. For example, the specific navigation capabilities of each UAV may be taken into consideration in generating maneuverability options from which to select for each UAV. In this way, fewer and/or less extreme maneuverability options may be generated for less nimble UAVs.

Furthermore, the system may seek to drive UAVs with different roles in different manners. In some embodiments, in addition to generally steering all other UAVs in a swarm toward the swarm-leader UAV, the system may endeavor to keep boxcar UAVs closer to the center of the swarm while keeping scout UAVs closer to the periphery of the swarm. This may be achieved, in some embodiments, by executing introducing additional constraints beyond only attraction and repulsion. Alternately or additionally, this may be achieved, in some embodiments, by applying a higher inter-UAV repulsion for scout UAVs than for boxcar UAVs, such that boxcar UAVs may naturally become more tightly packed at the center of a swarm while scout UAVs may naturally be forced to the less dense periphery of a swarm.

Alternately or additionally, in addition to generally steering all other UAVs in a swarm toward the swarm-leader UAV, the system may endeavor to keep certain UAVs (e.g., those with lighting and/or with superior collision tolerance) positioned near the "front" edge of the swarm as defined with respect to an overall direction of travel of the swarm.

As noted above, the first-level path planning algorithm may, in some embodiments, include the QUBO-based approach described above herein. In some embodiments, other path planning algorithms may be used for the first-level path planning algorithm.

For the second-level path planning algorithms, one or more of a number of different path-planning algorithms may be used. For example, the D* algorithm for autonomous vehicle navigation may be used. Additionally or alternatively, an algorithm specifically configured for UAV swarms and/or for individual UAV path planning may be used. Known autonomous vehicle and/or UAV navigation algorithms have different degrees of focus on path planning, obstacle avoidance, and collision avoidance. For certain embodiments of the systems described herein, for example if a focus on local behavior and ease of explainability of that behavior is desired, it may be advantageous to use QUBO approach (e.g., as described above) for the second-level path planning algorithms as well. To this end, a QUBO may be used to deconflict clusters of UAVs when they are in close proximity to each other, and a different QUBO may be used for each cluster.

In some embodiments, a cluster may be the same as a swarm, such that second-level path planning deconfliction is performed collectively for all UAVs in a swarm. In some embodiments, a cluster may include only part of a swarm, such that second-level path planning deconfliction is performed collectively for only some of the UAVs in a swarm with respect to one another. In some embodiments, a cluster may include some or all UAVs from multiple different swarms, for example in situations when it is unavoidable that two swarms come within close proximity to (or spatially overlap with) one another and inter-UAV deconfliction for UAVs in different swarms is necessary. In some embodiments, one or more suitable criteria may be applied to define clusters of UAVs for inter-UAV deconfliction purposes; for example, UAV proximity, speed, and/or heading may be considered. In some embodiments, for example where clusters are defined as equal to the entirety of respective swarms, the system may apply one or more merging criteria to determine when two swarms should be "merged" for the purposes of second-level path planning and inter-UAV deconfliction. Determinations as to whether to merge (or unmerge) two swarms for the purposes of second-level path planning and inter-UAV deconfliction may include UAV proximity, UAV speed, UAV heading, swarm proximity, swarm speed, and/or swarm heading. In some embodiments, an overall number of UAVs meeting merging criteria and/or a percentage of UAVs meeting merging criteria may be considered in determining whether to merge (or unmerge) two swarms for the purposes of second-level path planning and inter-UAV deconfliction.

Figure 10A:
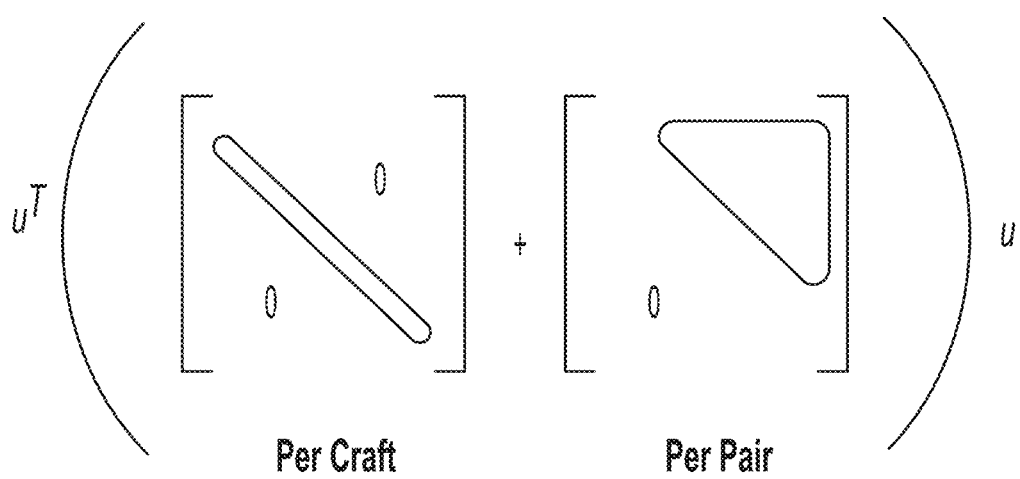
FIGS. 10A and 10B depict a QUBO structure, in accordance with some embodiments.
Figure 10B:
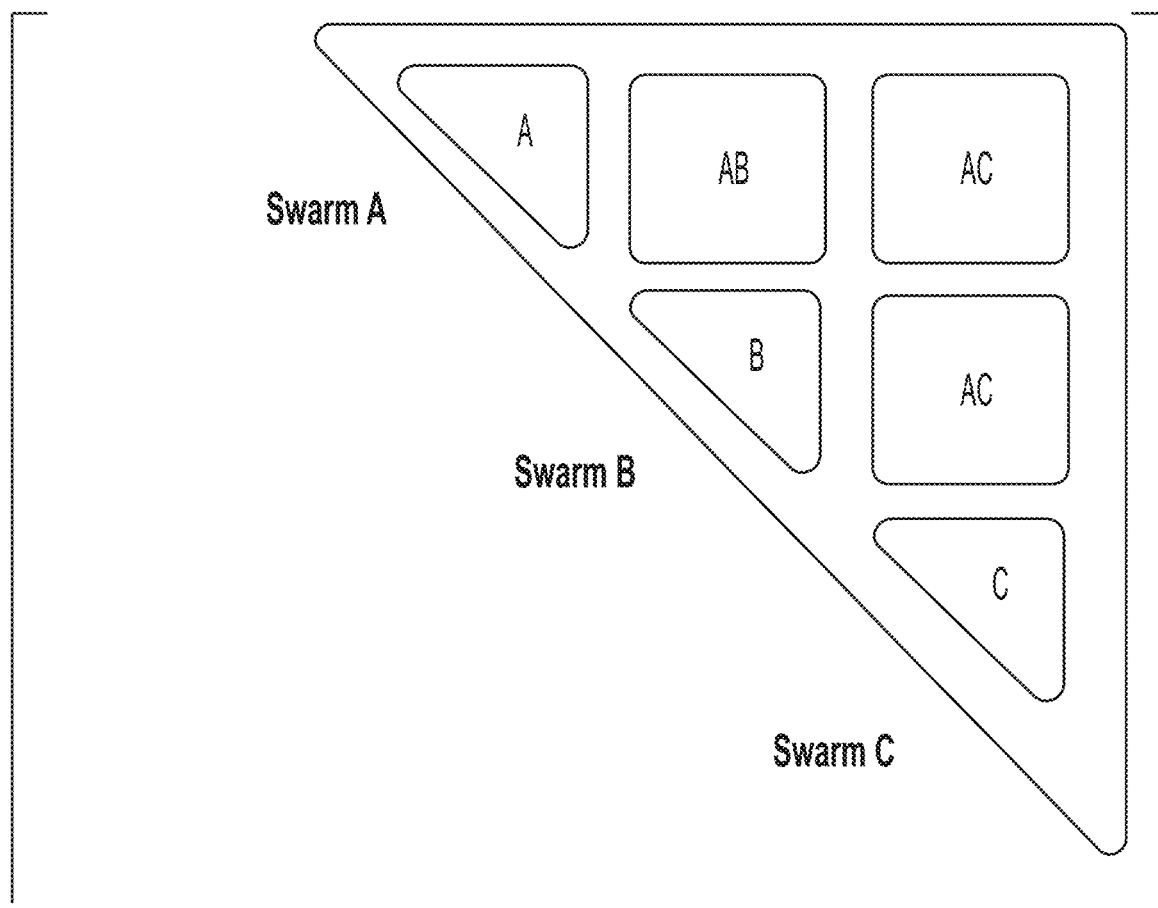

Conceptually, the path planning approach described herein, using a QUBO approach, may be understood as a decomposition of the upper triangle in the QUBO structure shown in FIGS. 10A and 10B. Elements along the thick-diagonal shown in FIG. 10A may store the elements relating to individual craft; elements on the upper triangle may contain elements relating to pairs of aircraft, both within the same swarm and between different swarms, as shown in FIG. 10B. It should be noted that this approach may be formalized as a single matrix that models all UAVs in the entire system, including all swarm leaders UAVs and all other UAVs across all swarms. Within such a total system matrix, when non-swarm-leader UAVs are sufficiently far apart from one another, their repulsion may drops to zero, such that they "ignore" each other for purposes of deconfliction. In such a total system matrix, however, swarm leaders may always impact one another in an attempt to deconflict swarms from one another; thus, swarm-leader repulsions may be non-zero regardless of distance. Thus, in a single-matrix formalization, when swarms are sufficiently far from one another, the only nonzero members of a swarm-vs-swarm block may be the swarm-leader UAVs, thus creating a sparse matrix in these blocks. It should be noted that the single-matrix formalization represents a different approach from the approach described below with respect to FIG. 11, in which control of the swarm-leader UAVs is handled by one matrix and control of UAVs within individual swarms is handled by separate, respective matrices. While the approaches may yield the same resulting controls, the latter approach using multiple matrices may significantly reduce computational complexity.

Figure 11:
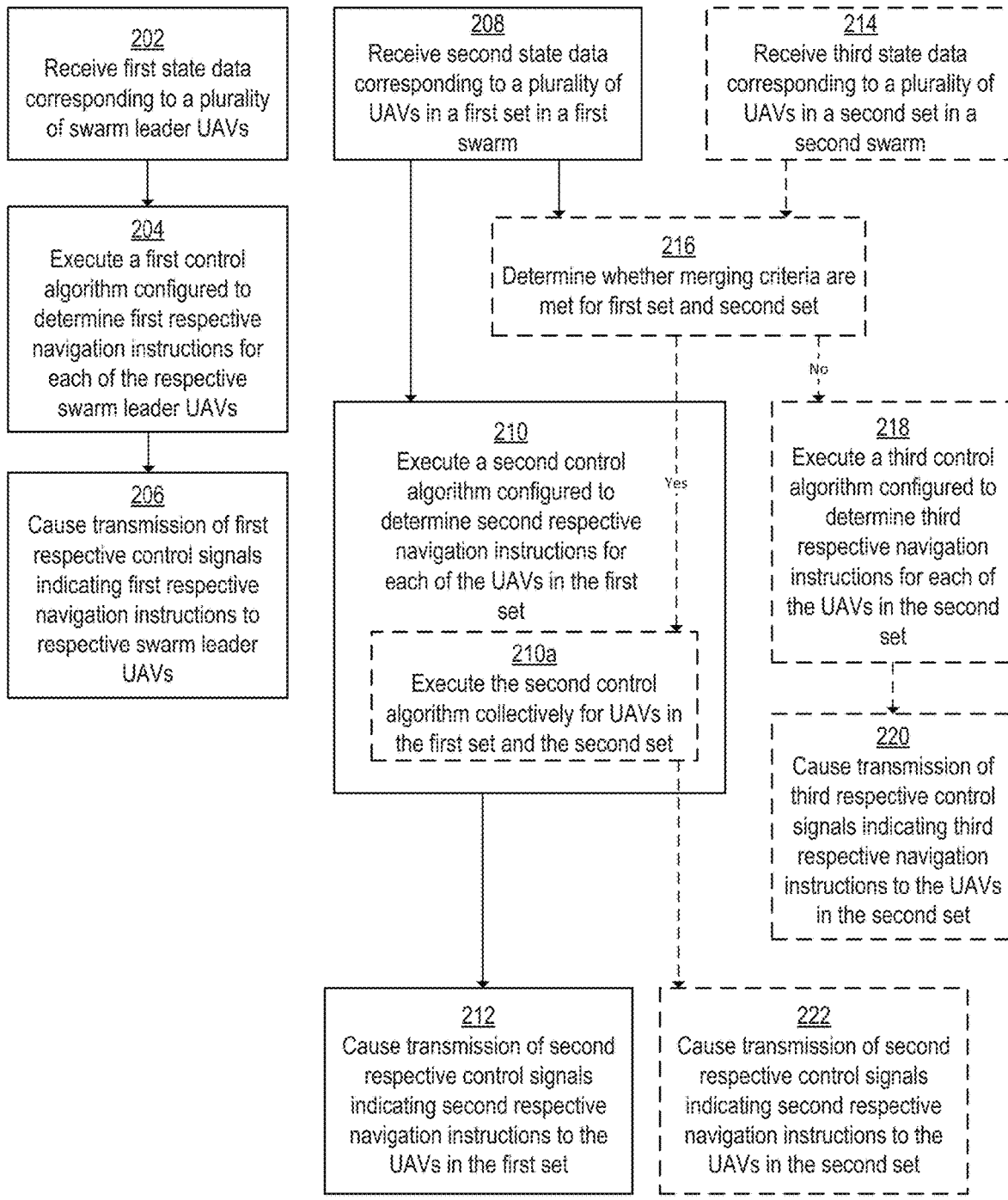
FIG. 11 depicts a flowchart depicting a method for controlling a plurality of UAVs arranged into a plurality of swarms, in accordance with some embodiments.

FIG. 11 shows a flowchart depicting a method 200 for controlling a plurality of UAVs arranged into a plurality of swarms, in accordance with some embodiments. In some embodiments, method 200 may be performed, in whole or in part, by system 100 (or by one or more components thereof) described above with reference to FIG. 9. In some embodiments, all or part of method 200 may be combined with all or part of any one or more techniques for autonomous vehicle or UAV path planning described or referenced herein.

As described elsewhere herein, methods for UAV path planning and control may involve applying separate path planning algorithms to separate groups of UAVs within an overall system. Method 200 demonstrates an embodiment of such an approach whereby swarm-leader UAVs are controlled according to a first path planning algorithm and UAVs within a first swarm are controlled according to a second path planning algorithm. UAVs within a second swarm are optionally controlled by a third path planning algorithm or by being merged into the second path planning algorithm if merging criteria are met. Method 200 is described in greater detail below.

Attention is first drawn to blocks 202-206, which depict implementation of the first path planning algorithm for control of swarm-leader UAVs. In some embodiments, blocks 202-206 may be performed by a single central computing system, such as series of one or more servers that are in communication with UAVs in the system. In the example of system 100 in FIG. 9, blocks 202-206 may be performed by central path planning engine 106.

At block 202, in some embodiments, the system may receive first state data corresponding to a plurality of swarm-leader UAVs. Exemplary state data may include location (e.g., longitude, latitude, altitude), orientation (e.g., cardinal orientation, heading, pitch, yaw, roll), speed (e.g., air-speed, ground-speed), and/or acceleration (e.g., thrust) of the respective UAVs. Exemplary data may include any derivatives (of any order) of any of the characteristics listed above. Data may also include the distance to UAV and the distance between UAVs, for example. In some embodiments, data regarding initial (e.g., current) UAV state(s) may be received one or more times (e.g., iteratively or dynamically) during a path planning and UAV control operation.

The state data may be received via any suitable wireless communication protocol, and may be received either directly or indirectly (e.g., via multiple communication hops) from the swarm-leader UAVs to be controlled and/or from one or more other sources. In the example of system 100 in FIG. 9, central path planning engine 106 may receive first state data corresponding to swarm-leader UAVs 102a and 104a.

At block 204, in some embodiments, the system may execute a first control algorithm configured to determine first respective navigation instructions for each of the respective swarm leaders. In some embodiments, the first control algorithm may include any suitable path planning and/or deconfliction algorithm configured to steer each respective swarm-leader UAV towards a respective destination and to prevent confliction between the swarm-leader UAVs. In some embodiments, the first control algorithm may include a QUBO-based path planning algorithm such as the algorithms described hereinabove.

In some embodiments, executing the first control algorithm may include generating one or more respective first groups of mutually exclusive maneuverability options for each of the swarm-leader UAVs. Maneuverability options may be generated based on UAV capabilities and/or other constraints (e.g., environmental constraints, environmental vector fields intended to "push" or "pull" UAVs in a certain direction, etc.). In some embodiments, the system may calculate, based on the first state data, a respective distance to the respective destination for each of the respective swarm-leader UAVs; and may calculate, based on the first state data, a respective inter-UAV repulsion for each of the respective swarm-leader UAVs. The system may then generate the first groups of mutually exclusive maneuverability options based on the first respective distance to a target for each of the respective swarm-leader UAVs and on the first respective inter-aircraft repulsion for each of the respective swarm-leader UAVs.

After the mutually-exclusive maneuverability options have been generated, the system may determine the first respective navigation instructions by generating a first solution representing, for each of the one or more respective first groups of mutually exclusive maneuverability options for each of the plurality of swarm-leader UAVs, a respective lowest-cost maneuverability option for the respective swarm-leader UAV. Determination of the lowest-cost maneuverability options may be achieved by the QUBO minimization process. Put another way, a system may choose an optimal solution (e.g., a best solution found within computational constraints) from the set of possible solutions (e.g., in a QUBO approach, by accounting for mutually-exclusive qubits). In some embodiments, generating the maneuverability options may be performed by classical computing components, while QUBO minimization may be performed by quantum computing components.

At block 206, in some embodiments, the system may cause transmission of first respective control signals indicating the first respective navigation instructions to the respective associated swarm-leader UAVs. Transmission of control signals indicating the determined navigation instructions (e.g., the selected maneuverability options) may be made by any suitable wireless communication protocol, and may be sent either directly or indirectly (e.g., via multiple communication hops) to the swarm-leader UAVs to be controlled. In the example of system 100 in FIG. 9, central path planning engine 106 may transmit the first control signals respectively to the associated swarm-leader UAVs 102a and 104a.

Attention is now drawn to blocks 208-212, which depict implementation of the second path planning algorithm for control of UAVs in a first set within a first swarm. In some embodiments, the first set may constitute all UAVs within the first swarm (or all non-swarm-leader UAVs within the first swarm). In some embodiments, blocks 208-212 may be performed by a single central computing system, such as a series of one or more servers that are in communication with UAVs in the system. In some embodiments, blocks 208-212 may be performed locally or quasi-locally to the first swarm, such as by one or more processors disposed on a UAV located in the swarm itself. In some embodiments, blocks 208-212 may be performed by one or more processors disposed onboard the swarm-leader UAV for the first swarm.

In the example of system 100 in FIG. 9, blocks 208-212 may be performed by one or more processors disposed onboard swarm-leader UAV 102a.

At block 208, in some embodiments, the system may receive second state data corresponding to a plurality of UAVs in a first set in a first swarm. Exemplary state data may include location (e.g., longitude, latitude, altitude), orientation (e.g., cardinal orientation, heading, pitch, yaw, roll), speed (e.g., air-speed, ground-speed), and/or acceleration (e.g., thrust) of the respective UAVs. Exemplary data may include any derivatives (of any order) of any of the characteristics listed above. Data may also include the distance to UAV and the distance between UAVs, for example. In some embodiments, data regarding initial (e.g., current) UAV state(s) may be received one or more times (e.g., iteratively or dynamically) during a path planning and UAV control operation.

The state data may be received via any suitable wireless communication protocol, and may be received either directly or indirectly (e.g., via multiple communication hops) from the UAVs to be controlled and/or from one or more other sources. In the example of system 100 in FIG. 9, swarm-leader UAV 102a may receive second state data corresponding to other UAVs in Swarm A, including UAVs 102b-d.

At block 210, in some embodiments, the system may execute a second control algorithm configured to determine second respective navigation instructions for each of the UAVs in the first set. In some embodiments, the second control algorithm may include any suitable path planning and/or deconfliction algorithm configured to steer each respective UAV in the set towards a respective swarm-leader UAV and to prevent confliction between the UAVs in the set. In some embodiments, the second control algorithm may include a QUBO-based path planning algorithm such as the algorithms described hereinabove.

In some embodiments, executing the second control algorithm may include generating one or more respective second groups of mutually exclusive maneuverability options for each of the UAVs in the first set. Maneuverability options may be generated based on UAV capabilities and/or other constraints (e.g., environmental constraints, environmental vector fields intended to "push" or "pull" UAVs in a certain direction, etc.). In some embodiments, the system may calculate, based on the second state data, a respective distance to the swarm-leader UAV for each of the respective UAVs in the first set; and may calculate, based on the second state data, a respective inter-UAV repulsion for each of the respective UAVs in the first set. The system may then generate the first groups of mutually exclusive maneuverability options based on the first respective distance to a target for each of the respective swarm-leader UAVs and on the first respective inter-aircraft repulsion for each of the respective swarm-leader UAVs.

After the mutually-exclusive maneuverability options have been generated, the system may determine the second respective navigation instructions by generating a second solution representing, for each of the one or more respective second groups of mutually exclusive maneuverability options for each of the plurality of UAVs in the first set, a respective lowest-cost maneuverability option for the respective UAV. Determination of the lowest-cost maneuverability options may be achieved by the QUBO minimization process. In some embodiments, generating the maneuverability options may be performed by classical computing components, while QUBO minimization may be performed by quantum computing components.

At block 212, in some embodiments, the system may cause transmission of second respective control signals indicating the second respective navigation instructions to the UAVs in the first set. Transmission of control signals indicating the determined navigation instructions (e.g., the selected maneuverability options) may be made by any suitable wireless communication protocol, and may be sent either directly or indirectly (e.g., via multiple communication hops) to the UAVs in the first set to be controlled. In the example of system 100 in FIG. 9, swarm-leader UAV 102a may transmit the second control signals respectively to the associated UAVs 102b-d.

Attention is now drawn to blocks 214-220, as well as sub-block 210a and block 222.

First, blocks 214, 218, and 220 depict implementation of the third path planning algorithm for control of UAVs in a second set within a second swarm, separate from the first swarm. In some embodiments, the second set may constitute all UAVs within the second swarm (or all non-swarm-leader UAVs within the first swarm). In some embodiments, blocks 214, 218, and 220 may be performed by a single central computing system, such as series of one or more servers that are in communication with UAVs in the system. In some embodiments, blocks 214, 218, and 220 may be performed locally or quasi-locally to the second swarm, such as by one or more processors disposed on a UAV located in the swarm itself. In some embodiments, blocks 214, 218, and 220 may be performed by one or more processors disposed onboard the swarm-leader UAV for the first swarm. In the example of system 100 in FIG. 9, blocks 214, 218, and 220 may be performed by one or more processors disposed onboard swarm-leader UAV 104a.

At block 214, in some embodiments, the system may receive third state data corresponding to a plurality of UAVs in a second set in a second swarm. At block 218, in some embodiments, the system may execute a third control algorithm configured to determine third respective navigation instructions for each of the UAVs in the second set. At block 220, in some embodiments, the system may cause transmission of third respective control signals indicating the third respective navigation instructions to the UAVs in the second set.

Blocks 214, 218, and 220 may correspond to blocks 208, 210, and 212, respectively, and may share any one or more characteristics in common therewith. In this manner, blocks 214, 218, and 220 demonstrate how the system (e.g., system 100) may execute a separate second-level control algorithm for path planning and deconfliction of UAVs in the second swarm. The default system configuration may be such that UAVs in separate swarms are controlled in accordance with separate control algorithms, in this manner.

Turning to block 216, which may follow from blocks 208 and 214, the system may, in some embodiments, determine whether one or more merging criteria are met for the first set and the second set. Block 216 depicts an example of a manner in which the system may determine whether or not to merge the control algorithms (e.g., the path planning and deconfliction operations) for non-swarm-leader UAVs in the first set and the second set. In some embodiments, the system may determine whether entire swarms should be merged with one another for purposes of second-level path planning and deconfliction. In some embodiments, this determination may be performed at each time-step of control and may be performed with respect to any one or more (or all) pairs of separate sets (and/or pairs of separate swarms) of UAVs within the system.

By determining whether merging criteria are met and responding accordingly, the system may account for situations in which two swarms come within close proximity to (or spatially overlap with) one another in spite of the general principle of inter-swarm deconfliction applied by the first control algorithm. In such situations, inter-UAV deconfliction for UAVs in different sets and/or different swarms may be necessary. Thus, the system may use one or more predefined and/or dynamically determined merging criteria to determine when UAV sets need to be merged to ensure that inter-UAV deconfliction is performed for all UAVs operating close proximity to one another.

In some embodiments, merging criteria may include whether one or more pairs of UAVs (and/or a threshold minimum number of pairs UAVs and/or a threshold minimum percentage of pairs of UAVs) are within a threshold distance of one another.

In some embodiments, merging criteria may account for UAV speed. For example, threshold distances or threshold numbers of nearby UAVs may be adjusted based on UAV speed, such that UAVs moving more quickly may be considered to meet merging criteria at greater distances from one another.

In some embodiments, merging criteria may account for UAV heading, such that UAVs headed toward one another may be considered to meet merging criteria while otherwise similarly situated UAVs headed away from each other may not.

In some embodiments, merging criteria may account for UAV maneuverability, such that less agile UAVs (e.g., those that take longer to adjust course) may be considered to meet merging criteria while otherwise similarly situated UAVs that are more agile may not.

In some embodiments, merging criteria may consider for state data of swarm-leader UAVs, non-swarm-leader UAVs, and/or overall swarm characteristics (or set characteristics) such as swarm heading, swarm size, swarm proximity swarm overlap, and/or swarm density.

Assessment of merging criteria may be performed by a central system in communication with both sets of UAVs, such as central planning engine 106 in system 100.

As shown in FIG. 11, if it is determined that merging criteria are not met, then the second set may be treated separately from the first set, as described with reference to FIGS. 218 and 220. On the other hand, if it is determined that merging criteria are met, then the second set of UAVs may be merged with the first set of UAVs for purposes of second-level (e.g., intra-swarm) path planning and deconfliction. For example, when a QUBO-based path planning and deconfliction algorithm, as described herein, is used, merging of two sets of UAVs may involve replacing two QUBO matrices or a first size by a single, larger, combined QUBO matrix. A single QUBO minimization may then be performed to select maneuverability options for all of the UAVs represented in the combined matrix.

Block 210a shows an example of path planning for the second set of UAVs in a situation in which the second set and first set are merged. As shown at block 210a, in some embodiments, executing the second control algorithm comprises executing the second control algorithm collectively for UAVs in the first set and the second set.

When two sets of UAVs are merged for the purposes of intra-swarm path planning and deconfliction, execution of the control algorithm may be performed at any suitable location and by any suitable system, such as by a central path planning engine and/or by a swarm-leader UAV associated with either set (or swarm) that has been merged. State data for UAVs in merged swarms may be transmitted, directly and/or indirectly, to the appropriate one or more processors for execution of the collective intra-swarm path planning and deconfliction algorithm. For example, when a swarm-leader UAV is executing QUBO-based path planning for UAVs in merged swarms, state data for UAVs in the merged swarms may be transmitted to the swarm-leader UAV carrying out the computations.

In the example of system 100 in FIG. 9, if Swarm B is merged with Swarm A, collective path planning and deconfliction for individual UAVs in both Swarms may be performed by one or more processors disposed onboard swarm-leader UAV 102*a*. In other embodiments, the operations could be performed by one or more processors disposed onboard swarm-leader UAV 104*a* and/or by central path planning engine 106.

At block 222, in some embodiments, the system may cause transmission of the second respective control signals indicating the second respective navigation instructions to the UAVs in the second set. This transmission may be made in a similar manner to the transmission described with respect to block 212. In some embodiments, transmission of instructions for UAVs in a merged swarm may be transmitted directly to the UAVs in the merged swarm. In some embodiments, transmission of instructions for UAVs in a merged swarm may be made indirectly, such as by first being sent to a swarm-leader UAV corresponding to UAVs that have been merged into a different swarm, such that the swarm-leader UAV for the individual UAVs can then transmit the instructions to the individual UAVs.

In the example of system 100, if swarm-leader UAV 102*a* generates control signals for control of UAVs 104*b-d*, then UAV 102*a* may transmit said control signals directly to UAVs 104*b-d*, may transmit said control signals to UAVs 104*b-d* via UAV 104*a*, and/or may transmit said control signals to UAVs 104*b-d* via central path planning engine 106.

UAV Swarm Path Planning and Deconfliction Examples

Example 4—Conflicting Paths

Figure 12:
FIGS. 12-14 depict flight paths for UAVs produced by applying a swarm-based UAV path planning algorithm, in accordance with some embodiments.
Figure 13:
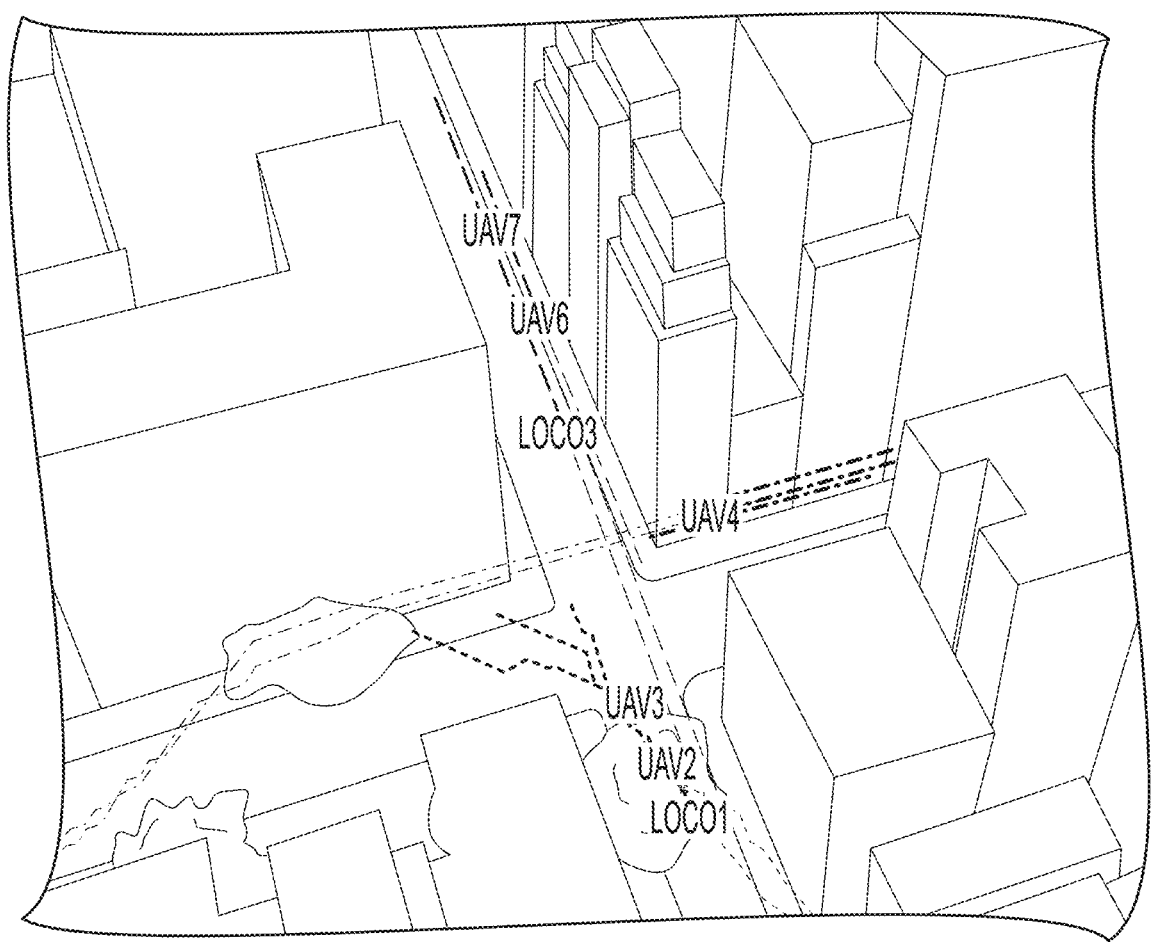
Figure 14:
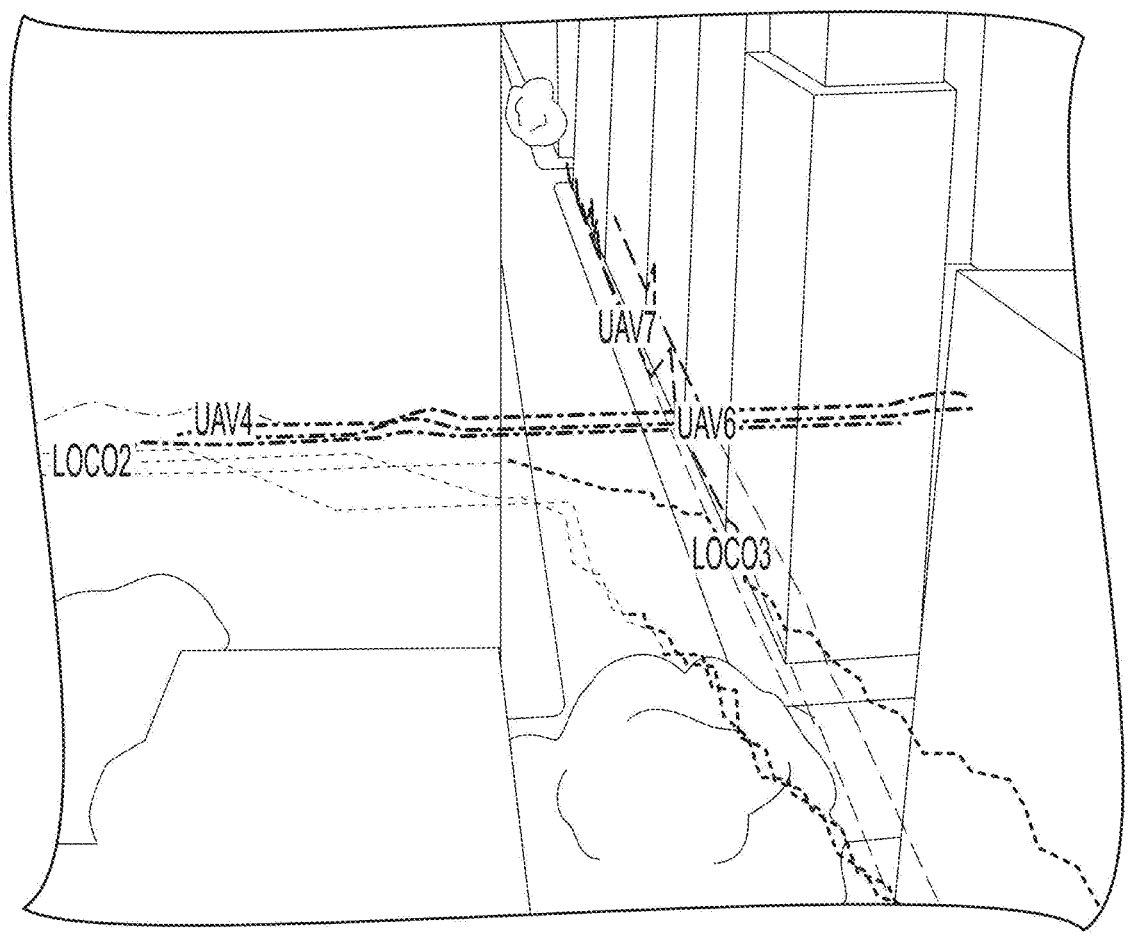

In this example of the UAV swarm path planning techniques described herein, three UAV swarms enter a common intersection, each heading in a different direction, as shown in FIG. 12. As the swarms approach one another, a centralized path planning engine that is directing first-level path planning and deconfliction at the overall swarm level detects a conflict between the red and blue swarms, as shown in FIG. 12. Because there is an open street available, the centralized path planning engine directs the red swarm off its primary route to avoid the conflict, as shown in FIG. 13. Meanwhile, as shown in FIGS. 12 and 13, the green swarm is also repulsed by blue swarm, causing it to pause. Eventually, the blue swarm passes and the green swarm continues, following in the path of the rerouted red swarm, as shown in FIG. 14. As the swarms have been strategically rerouted, there is minimal need for the individual UAVs to make inter-swarm corrections; instead, the individual UAVs may continue to maintain safe intra-swarm separations without computational resources being expended on deconfliction of individual UAVs across different swarms.

Example 5—Interleaving Paths

Figure 15:
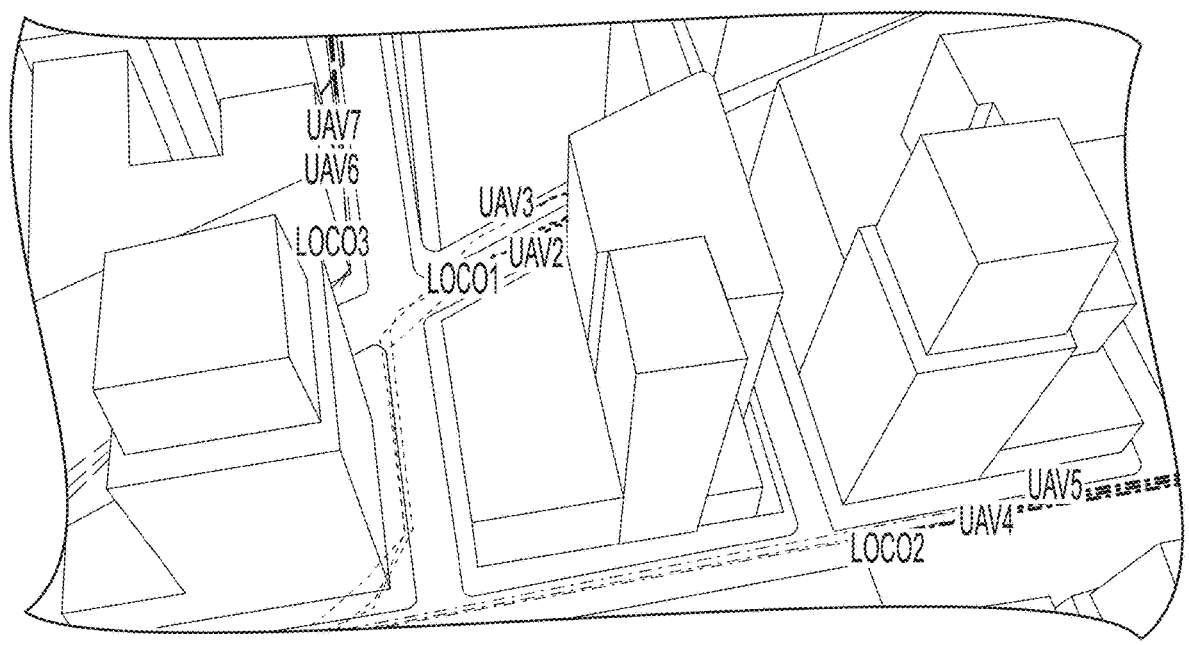
FIGS. 15-17 depict flight paths for UAVs produced by applying a swarm-based UAV path planning algorithm, in accordance with some embodiments.
Figure 16:
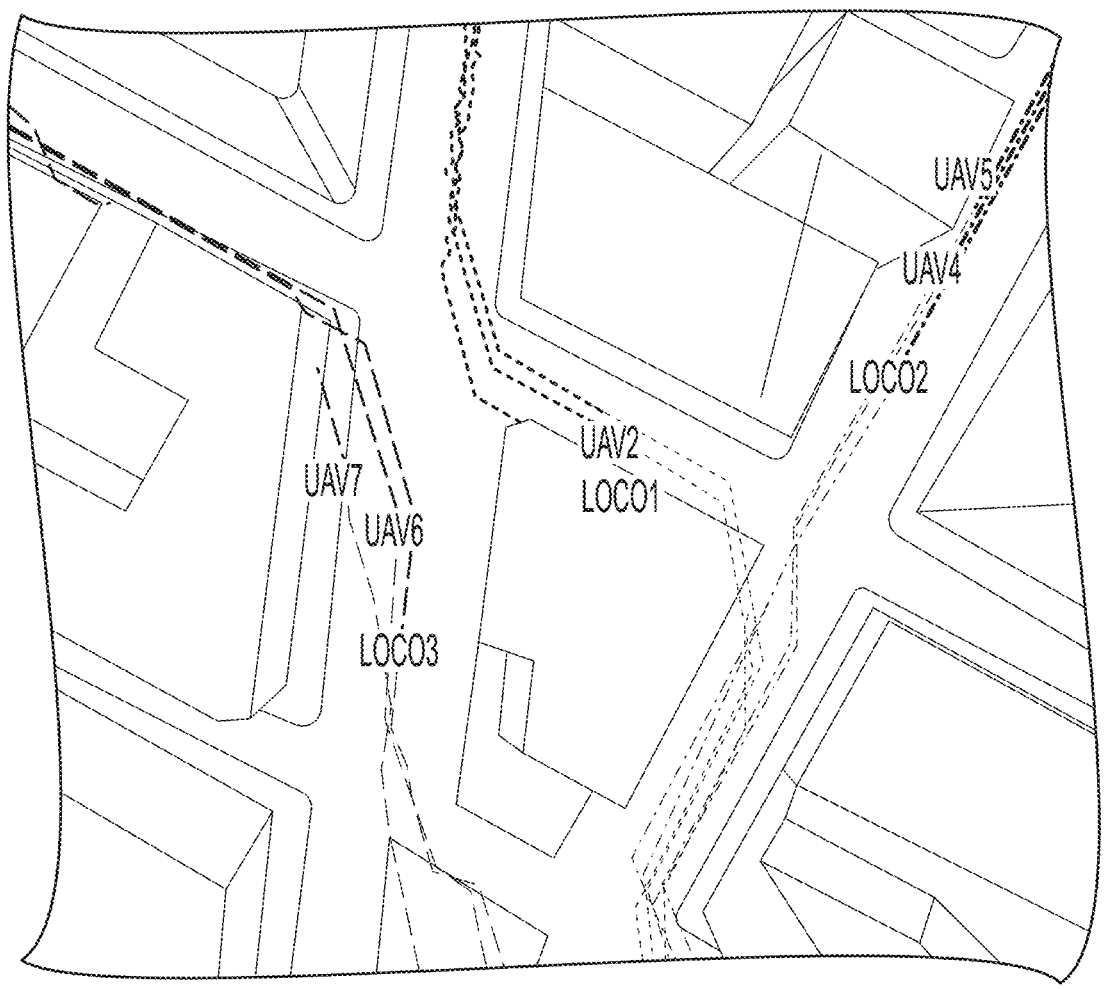
Figure 17:
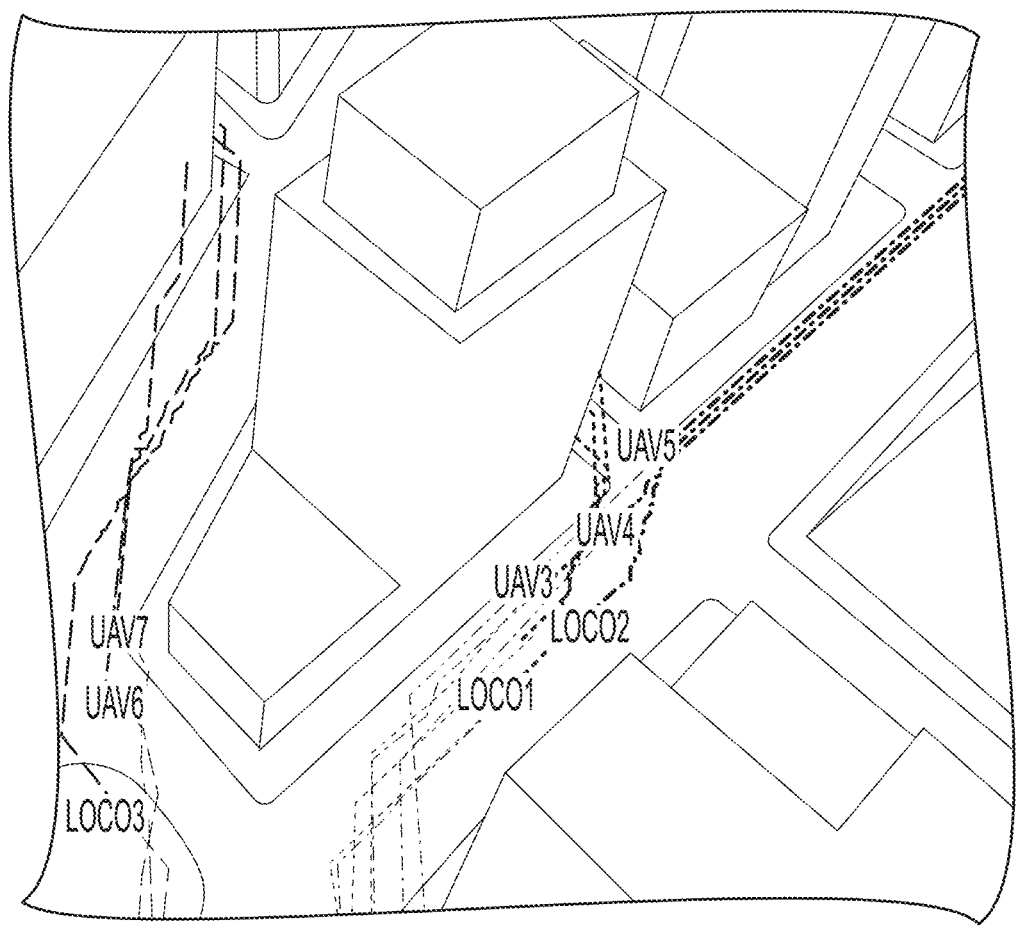

In this example of the UAV swarm path planning techniques described herein, three swarms are heading in the same direction, but they are forced to partially interleave with one another. As the swarms approach one another as shown in FIG. 15, a centralized path planning engine that is directing first-level path planning and deconfliction at the overall swarm level detects a conflict between the red and green swarms. Because there is an open street available, the centralized path planning engine directs the red swarm off its primary route to avoid the conflict with the green swarm, as shown in FIG. 16. This reroute, however, causes the red swarm to interfere with the blue swarm, and the centralized path planning engine therefore causes the blue swarm to pause. When the blue swarm resumes motion, the tail of the red swarm is intermingled with the head of the blue swarm, as shown in FIG. 17. Because the red and blue swarms are intermingled with one another, the system performs inter-swarm UAV-to-UAV deconfliction for individual UAVs in the red and blue swarms, in accordance with the collective multi-swarm second-level path planning and deconfliction techniques described herein. The turbulent motion shown in FIG. 17 is a result of the system applying inter-swarm UAV-to-UAV deconfliction for individual UAVs in the red and blue swarms.

UAV Swarm Path Planning and Deconfliction Examples Considering Latency

The following two examples consider how latency issues may impact UAV separation within swarming scenarios, including when applying UAV Swarm path planning techniques such as those described herein. In particular, the following examples compare two different latencies in two scenarios. See Table 5 below for numerical values for the latency examples.

TABLE 5

Values for Latency Examples

| Qualifier | Measurement | Value |
| --- | --- | --- |
| minimum | separation | 5 m |
| rogue scenario | swarm size | 5 |
| two-swarm scenario | swarm size | 3 |
| low intra-swarm | latency | 150 ms |
| low inter-swarm | latency | 600 ms |
| high intra-swarm | latency | 300 ms |
| high inter-swarm | latency | 1200 ms |

Example 6—Rogue Drone

Figure 18:
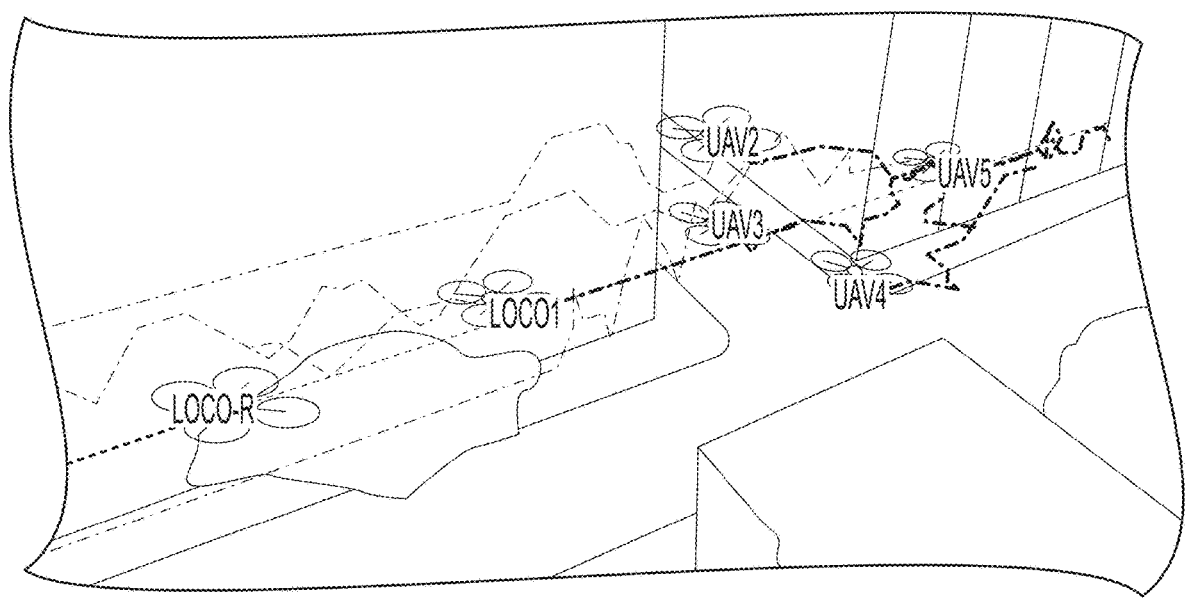
FIGS. 18-20 depict flight paths for UAVs produced by applying a swarm-based UAV path planning algorithm, in accordance with some embodiments.
Figure 19:
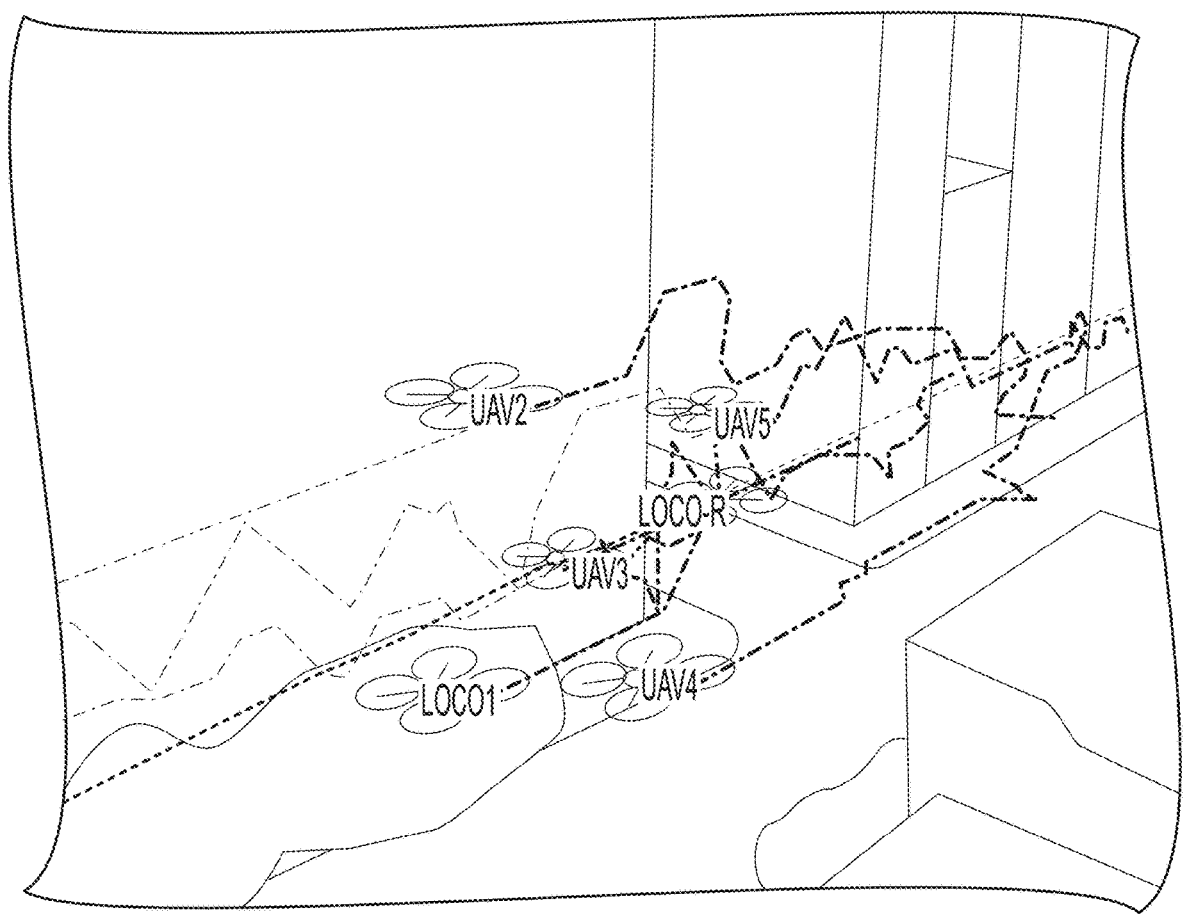
Figure 20:
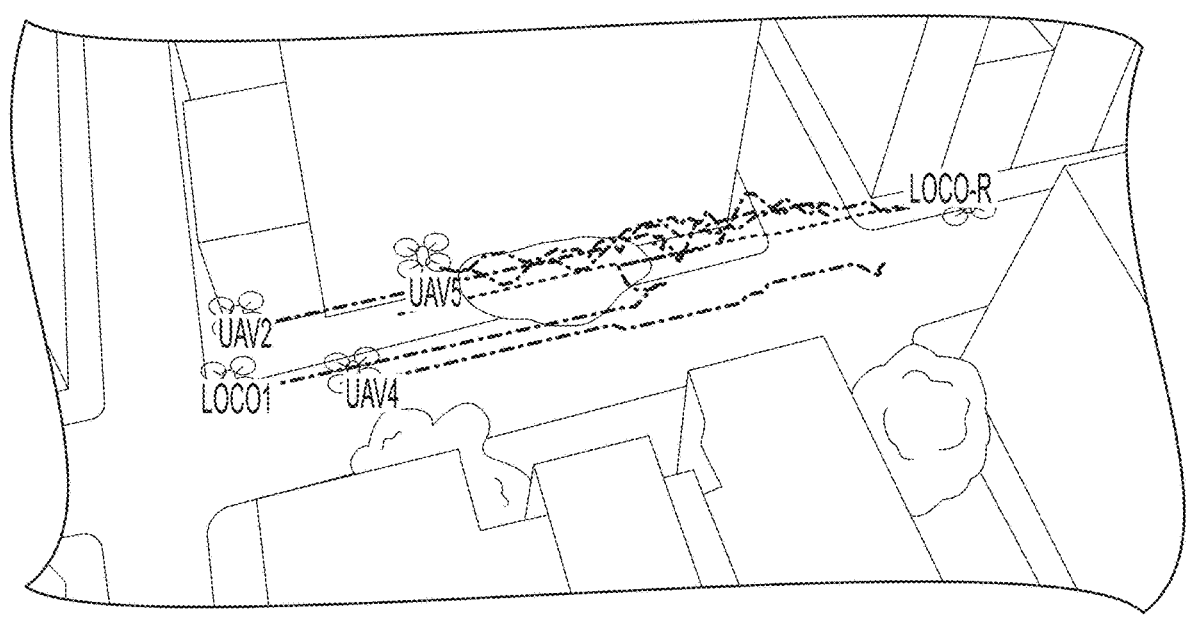

In this example, the impact of different latencies is demonstrated in a scenario in which a single "rogue" UAV ("LOCO-R") heads directly into a UAV swarm, as shown in FIGS. 18-20. As shown, the rogue drone (red) passes through the blue swarm, and the UAVs in the blue swarm perform evasive maneuvers to avoid confliction with the rogue drone and with one another. This is achieved by applying an intra-swarm UAV-to-UAV path planning and deconfliction algorithm for the blue swarm, such that the system considers the presence and state data of the rogue drone in controlling navigation of individual UAVs in the blue swarm.

Figure 21:
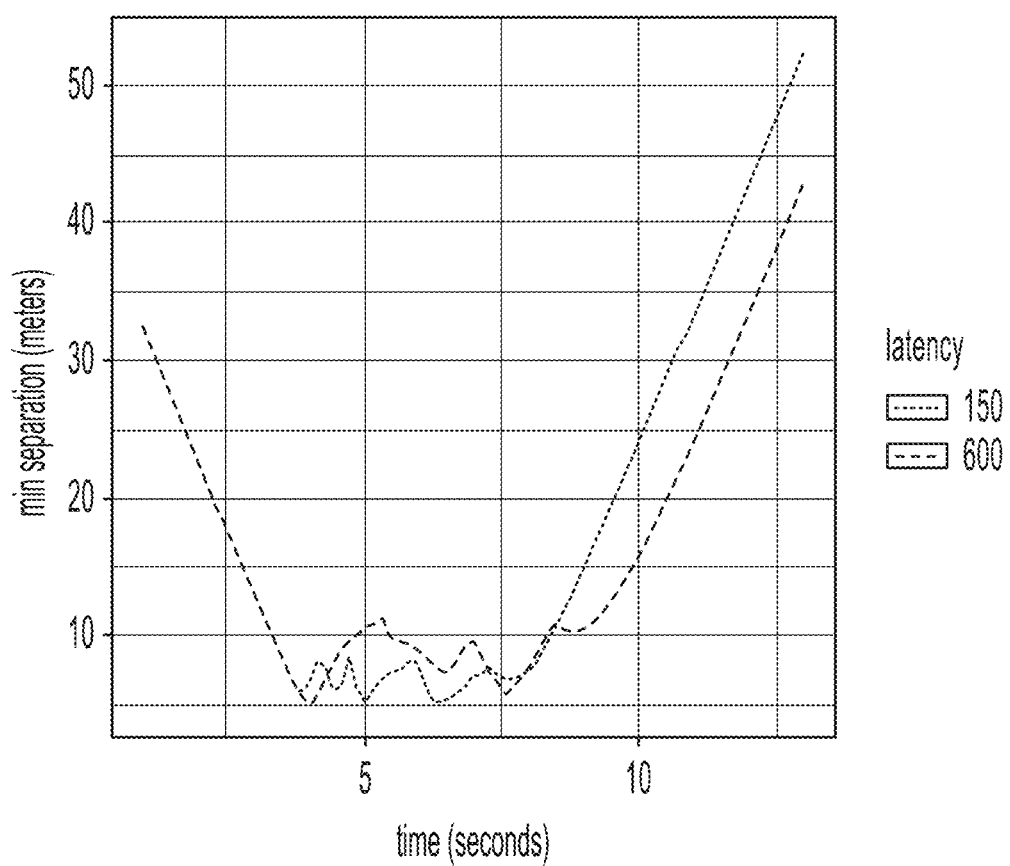
FIG. 21 depicts a plot of minimum separation between a swarm and the rogue UAV over time, wherein the swarm is controlled by a swarm-based UAV path planning algorithm, in both a high-latency implementation and in a low-latency implementation, in accordance with some embodiments.

FIG. 21 plots the minimum separation between the swarm and the rogue over time, in both a high-latency implementation of this example and in a low-latency implementation of this example (see latency values in Table 5 above for communication between UAVs within the swarm and for communication with UAVs outside the swarm (e.g., the rogue UAV)). The behavior for both latency cases follows a "U" shape as the rogue heads into the swarm into then away from the swarm. At no time do UAVs violate the minimum separation distance of five meters. Note that the lower latency case is able to stabilize more rapidly and thus produces a larger minimum separation after the crossing.

Figure 22:
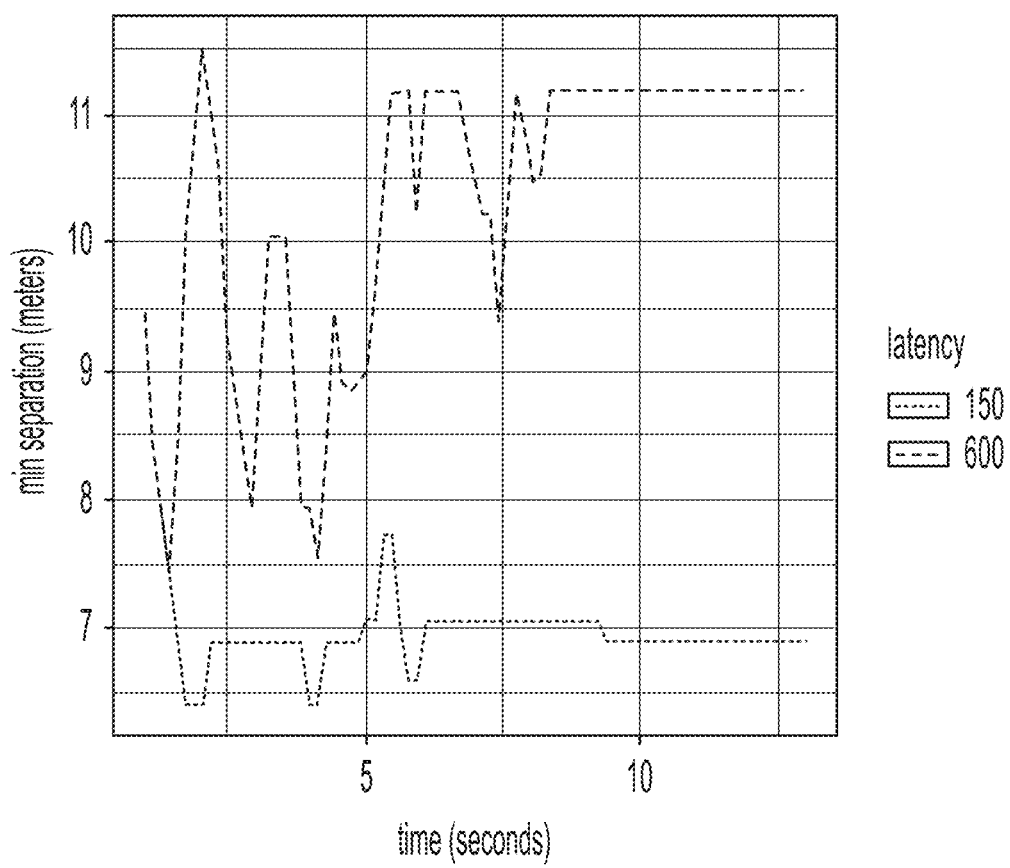
FIG. 22 depicts a plot of minimum separation distance within a swarm proximate to a rogue UAV over time, wherein the swarm is controlled by a swarm-based UAV path planning algorithm, in both a high-latency implementation and in a low-latency implementation, in accordance with some embodiments.

FIG. 22 plots the minimum separation distance within the swarm over time for both the high-latency and low-latency implementations. Note that while neither implementation violates the minimum separation, the higher latency implementation requires a larger steady-state minimum separation to account for the longer gaps between positional information.

Example 6—Two Swarms

Figure 23:
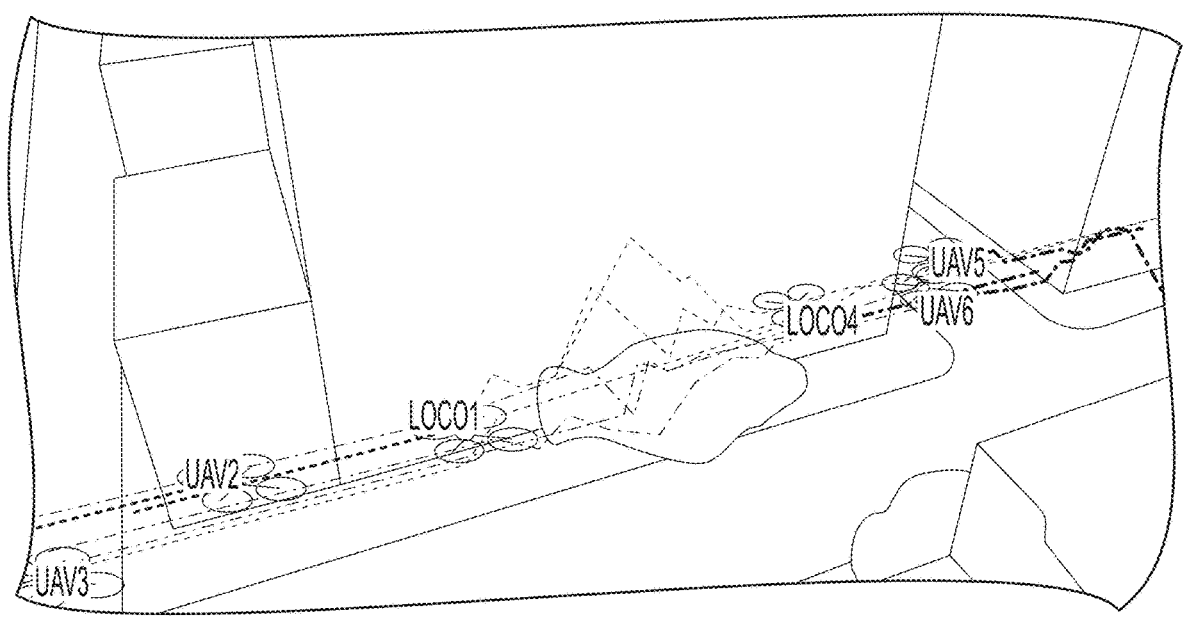
FIGS. 23-25 depict flight paths for UAVs produced by applying a swarm-based UAV path planning algorithm, in accordance with some embodiments.
Figure 24:
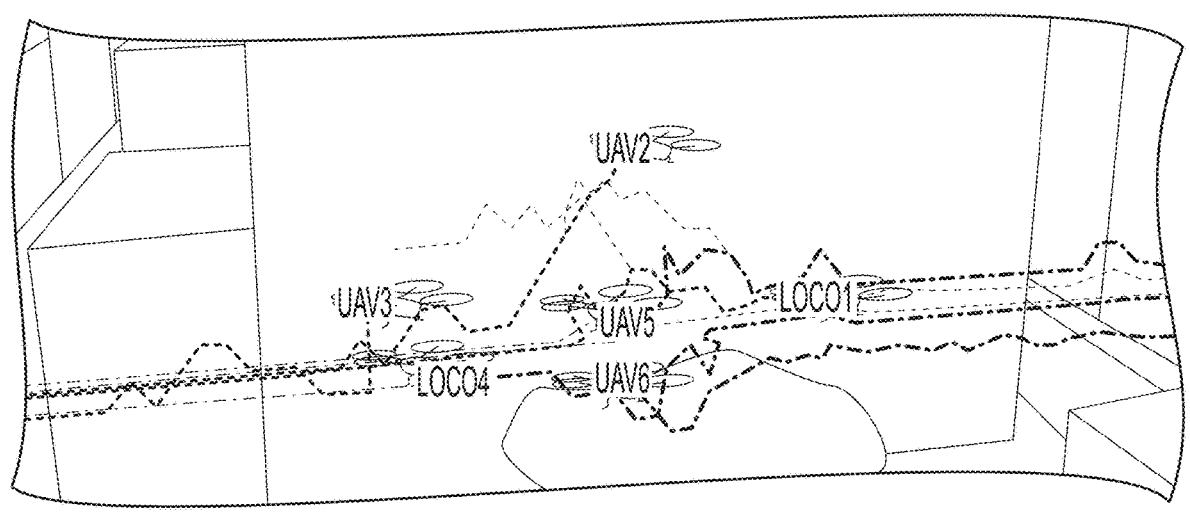
Figure 25:
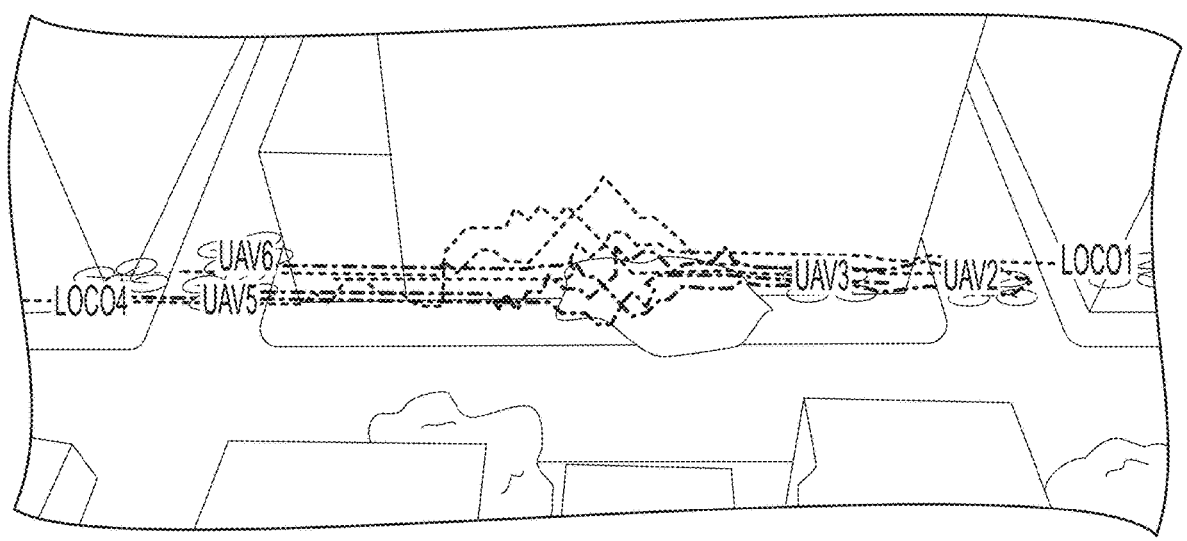

In this example, the impact of different latencies is demonstrated in a scenario in which two swarms head directly into one another, as shown in FIGS. 23-25. As shown in FIGS. 23-25, the system performs intra-swarm UAV-to-UAV path planning and deconfliction, in accordance with the techniques described herein, such that the individual UAVs within each swarm avoid conflicts with other UAVs in both swarms.

Figure 26:
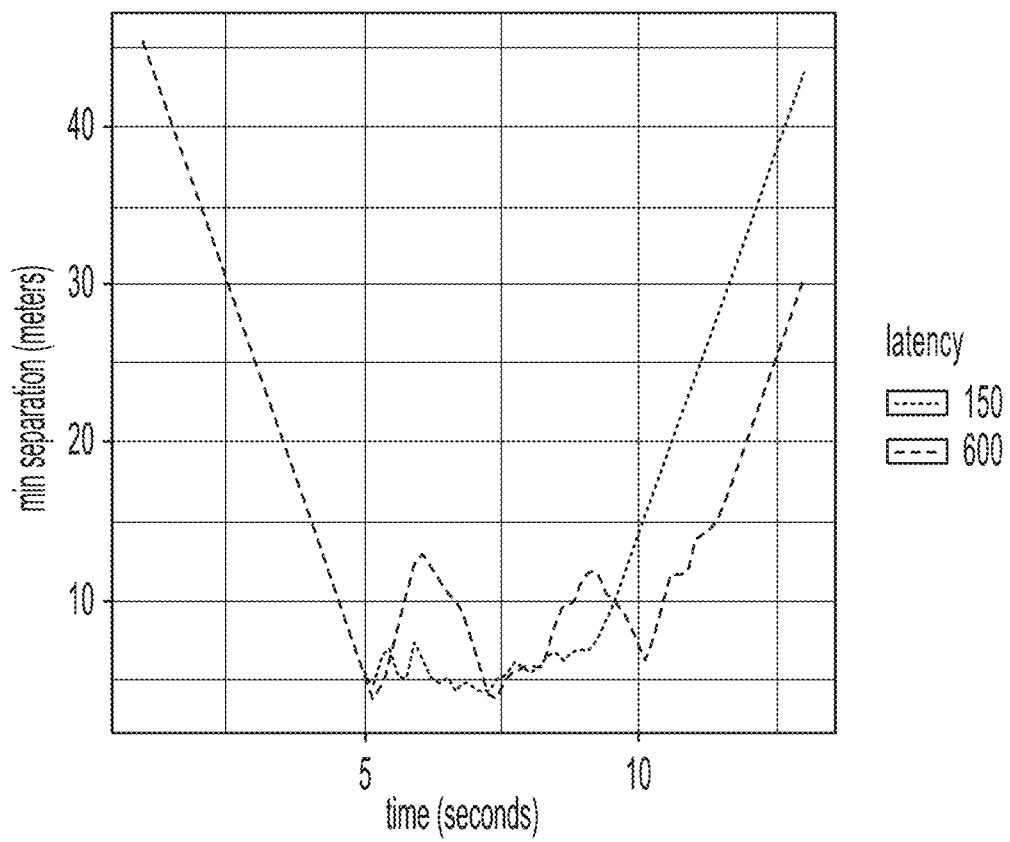
FIG. 26 depicts a plot of minimum separation between swarms over time, wherein the swarms are controlled by a swarm-based UAV path planning algorithm, in both a high-latency implementation and in a low-latency implementation, in accordance with some embodiments.

FIG. 26 plots minimum separation between the two swarms over time, in both a high-latency implementation of this example and in a low-latency implementation of this example (see latency values in Table 5 above for communication between UAVs within the same swarm and for inter-swarm communication). Again, both scenarios follow a "U" shape and do not violate the minimum separation distance.

Figure 27:
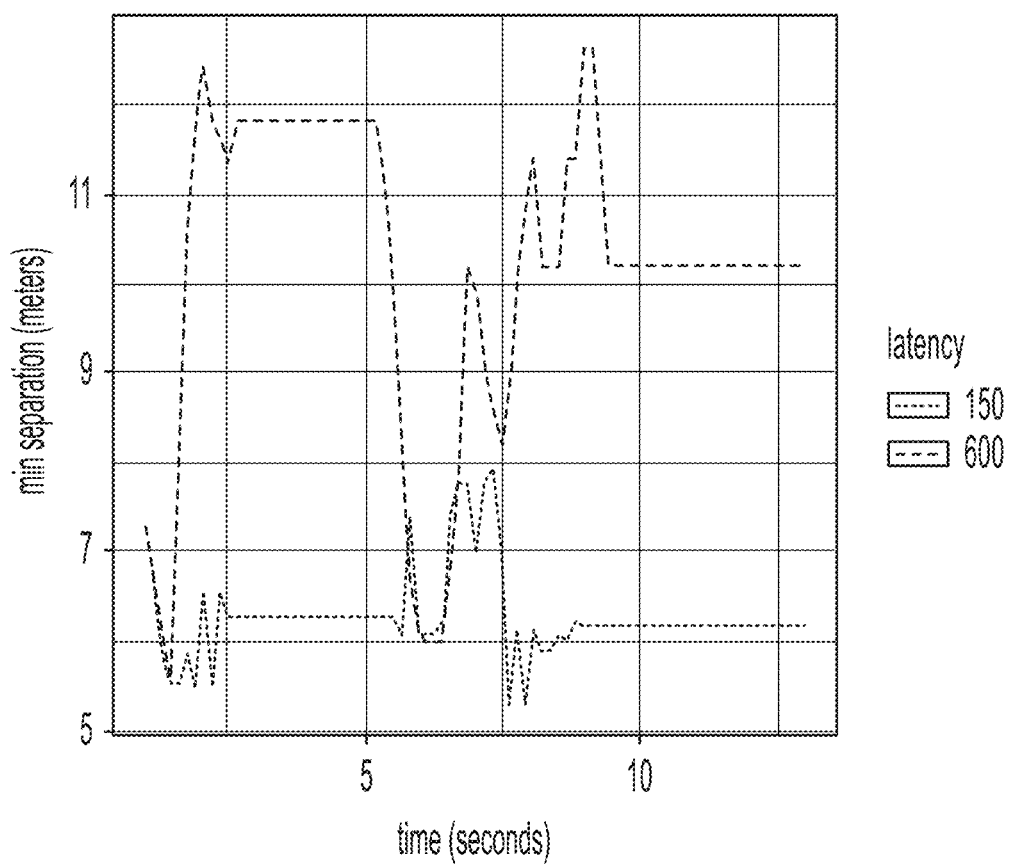
FIG. 27 depicts a plot of minimum separation distance within a swarm proximate to another swarm over time, wherein the swarms are controlled by a swarm-based UAV path planning algorithm, in both a high-latency implementation and in a low-latency implementation, in accordance with some embodiments.

FIG. 27 plots the minimum separation distance over time within one of the swarms, in both the high-latency and low-latency implementations. Again, the higher latency implementation requires a larger steady state minimum separation before and after the crossing. (The turbulence prior to crossing is due to the UAV starting at positions below their desired safe separation distances.)

While the disclosures herein have primarily references control of UAVs, the techniques described herein may in some embodiments be applied to control of other kinds of aircraft and/or other kinds of autonomous or semi-autonomous vehicles.

Exemplary Computing System

Figure 28:
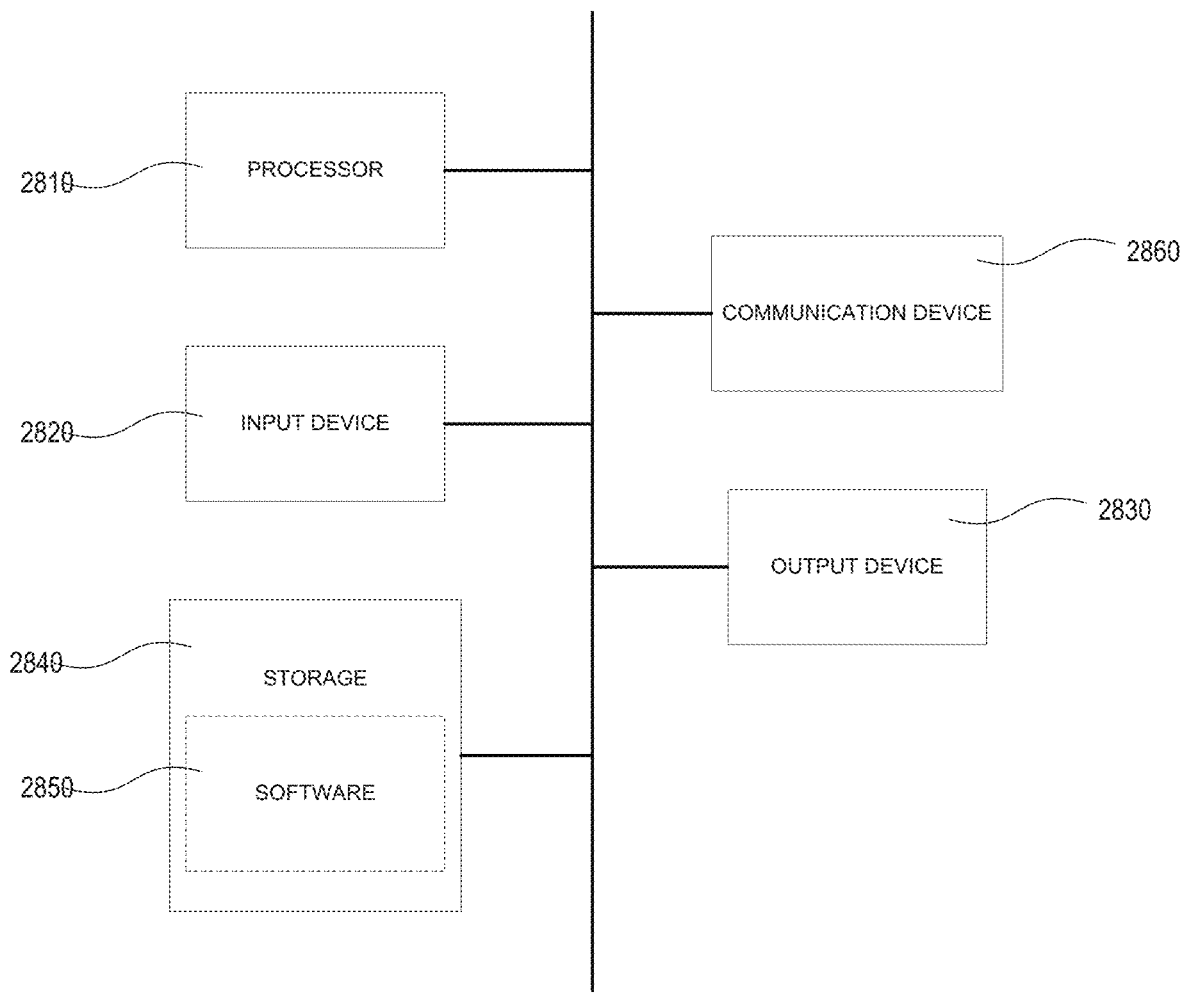
FIG. 28 depicts a computer, in accordance with some embodiments.

FIG. 28 illustrates an exemplary computing system, in accordance with some embodiments. Computing system 2800 can be a component of a system for UAV control and/or UAV swarm control, for example system 100 and/or any of its subcomponents described above with respect to FIG. 9. In some embodiments, computing system 2800 may be configured to execute all or part of a method for UAV control and/or UAV swarm control, such as all or part of method 200 described above with respect to FIG. 11.

Computing system 2800 can include a host computer connected to a network. Computing system 2800 can be a client computer or a server. As shown in FIG. 28, computing system 2800 can be any suitable type of microprocessor-based device, such as a personal computer; workstation; server; or handheld computing device, such as a phone or tablet. The computer can include, for example, one or more of processor 2810, input device 2820, output device 2830, storage 2840, and communication device 2860.

Input device 2820 can be any suitable device that provides input, such as a touch screen or monitor, keyboard, mouse, or voice-recognition device. Output device 2830 can be any suitable device that provides output, such as a touch screen, monitor, printer, disk drive, or speaker.

Storage 2840 can be any suitable device that provides storage, such as an electrical, magnetic, or optical memory, including a RAM, cache, hard drive, CD-ROM drive, tape drive, or removable storage disk. Communication device 2860 can include any suitable device capable of transmitting and receiving signals over a network, such as a network interface chip or card. The components of the computer can be connected in any suitable manner, such as via a physical bus or wirelessly. Storage 2840 can be a non-transitory computer-readable storage medium comprising one or more programs, which, when executed by one or more processors, such as processor 2810, cause the one or more processors to execute methods described herein, such as all or part of method 200 described above with respect to FIG. 11.

Software 2850, which can be stored in storage 2840 and executed by processor 2810, can include, for example, the programming that embodies the functionality of the present disclosure (e.g., as embodied in the systems, computers, servers, and/or devices as described above). In some embodiments, software 2850 can be implemented and executed on a combination of servers such as application servers and database servers.

Software 2850 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 2840, that can contain or store programming for use by or in connection with an instruction execution system, apparatus, or device.

Software 2850 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computing system 2800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing system 2800 can implement any operating system suitable for operating on the network. Software 2850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Additionally, those skilled in the art would understand that one or more (e.g., all) of the above described components and features may be combined without departing from the scope of the disclosure. Finally, the entire disclosure of the patents and publications referred to in this application are hereby incorporated herein by reference.

The invention claimed is:

1. A system for unmanned aerial vehicle (UAV) control, the system comprising:
   a plurality of UAVs, wherein the plurality of UAVs is divided into a plurality of respective UAV swarms, each UAV swarm comprising a respective subset of the plurality of UAVs, each subset including a respective swarm-leader UAV;
   one or more processors configured to:
      receive first state data specifying respective position data and respective heading data corresponding to each of the swarm-leader UAVs;
      execute a first control algorithm configured to determine first respective navigation instructions for each of the respective swarm-leader UAVs, based on the first state data, to navigate each of the respective swarm-leader UAVs toward a respective destination and to avoid confliction with the other swarms;
      cause transmission of first respective control signals to the swarm-leader UAVs, wherein the respective control signals indicate the first respective navigation instructions for the respective swarm-leader UAV;
      receive second state data specifying respective position data and respective heading data corresponding to each UAV of a first set of UAVs, wherein the first set of UAVs comprise UAVs in a first swarm of the plurality of respective UAV swarms;
      execute a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and
      cause transmission of second respective control signals to UAVs in the first set, wherein the second respective control signals indicate the second respective navigation instructions for the respective UAVs in the first set,
   wherein executing the first control algorithm comprises:
      generating one or more respective first groups of mutually exclusive maneuverability options for each of the swarm-leader UAVs; and
      determining the first respective navigation instructions by generating a first solution representing, for each of the one or more respective first groups of mutually exclusive maneuverability options for each of the plurality of swarm-leader UAVs, a respective lowest-cost maneuverability option for the respective swarm-leader UAV; and
   executing the second control algorithm comprises:
      generating one or more respective second groups of mutually exclusive maneuverability options for each of the UAVs in the first set; and
      determining the second respective navigation instructions by generating a second solution representing, for each of the one or more respective second groups of mutually exclusive maneuverability options for each of the plurality of UAVs in the first set, a respective lowest-cost maneuverability option for the respective UAVs in the first set.

2. The system of claim 1, wherein:
   executing the first control algorithm comprises:
      calculating, based on the first state data, a respective distance to the respective destination for each of the respective swarm-leader UAVs;
      calculating, based on the first state data, a respective inter-UAV repulsion for each of the respective swarm-leader UAVs; and
      generating the one or more first groups of mutually exclusive maneuverability options based on the respective distance to the respective destination for each of the respective swarm-leader UAVs and on the respective inter-UAV repulsion for each of the respective swarm-leader UAVs; and
   executing the second control algorithm comprises:
      calculating, based on the second state data, a respective distance to the swarm-leader UAV for the respective UAVs in the first set;
      calculating, based on the second state data, a respective inter-UAV repulsion for each of the respective UAVs in the first set; and
      generating the one or more second groups of mutually exclusive maneuverability options based on the respective distances to swarm-leader UAV for each of the respective UAVs in the first set and on the respective inter-UAV repulsion for each of the respective UAVs in the first set.

3. The system of claim 2, wherein inter-UAV repulsion for each of the respective swarm-leader UAVs and inter-UAV repulsion for each of the respective UAVs in the first set are weighted differently, such that repulsion between pairs of UAVs in the first set is weaker than repulsion between UAVs in different swarms.

4. The system of claim 1, wherein the one or more processors are configured to:
   receive third state data specifying respective position data and respective heading data corresponding to each UAV of a second set of UAVs, wherein the second set of UAVs comprise UAVs in a second swarm of the plurality of respective UAV swarms;
   determine, based on one or more of the first state data, the second state data, and the third state data, whether a first set of one or more merging criteria are satisfied;
   if it is determined that the first set of one or more merging criteria are not satisfied:
   execute a third control algorithm, separate from the second control algorithm, with respect to the second set of UAVs, wherein the third control algorithm is configured to determine third respective navigation instructions for each UAV in the second set, based on the third state data, to navigate each of the respective UAVs in the second set toward a swarm-leader UAV for the second swarm and to avoid confliction with other UAVs in the second set; and
   cause transmission of third respective control signals to UAVs in the second set, wherein the third respective control signals indicate the third respective navigation instructions for the respective UAVs in the second set; and if it is determined that the first set of one or more merging criteria are satisfied:
execute the second control algorithm collectively with respect to the first set of UAVs and the second set of UAVs, wherein determining the second respective navigation instructions comprises determining the second respective navigation instructions for each UAV in the second set, based on the second state data and the third state data, to navigate each of the respective UAVs in the second set toward a swarm-leader UAV for the second swarm and to avoid confliction with other UAVs in the first set and in the second set; and
cause transmission of the second respective control signals to UAVs in the second set.

5. The system of claim 4, wherein executing the second control algorithm collectively comprises:
generating one or more respective second groups of mutually exclusive maneuverability options for each of the UAVs in either the first set or the second set; and
determining the second respective navigation instructions by generating a second solution representing, for each of the one or more respective second groups of mutually exclusive maneuverability options for each of the plurality of UAVs in either the first set or the second set, a respective lowest-cost maneuverability option for the respective UAVs in either the first set or the second set.

6. The system of claim 4, wherein determining whether the first set of one or more merging criteria are satisfied comprises determining whether one or more UAVs in the first swarm are within a threshold minimum distance from one or more UAVs in the second swarm.

7. The system of claim 4, wherein determining whether the first set of one or more merging criteria are satisfied comprises determining whether one or more UAVs in the first swarm and one or more UAVs in the second swarm will come within a threshold minimum distance from one another within a threshold amount of time.

8. The system of claim 1, wherein the one or more processors comprise:
one or more classical processors configured to receive the first state data, cause the transmission of the first respective control signals, receive the second state data, and cause transmission of the second respective control signals; and
one or more quantum processors configured to execute at least a portion of the first control algorithm and to execute at least a portion of the second control algorithm.

9. The system of claim 1, wherein the one or more processors comprise:
a set of one or more central processors configured to execute the first control algorithm and cause transmission of the first respective control signals to the swarm-leader UAVs; and
a set of one or more swarm-specific processors configured to execute the second control algorithm and cause transmission of the second respective control signals to UAVs in the first set.

10. The system of claim 9, wherein:
the set of one or more swarm-specific processors is disposed onboard a swarm-leader UAV for the first swarm; and
transmission of the second respective control signals to UAVs in the first set is transmitted from the swarm-leader UAV for the first swarm.

11. The system of claim 1, wherein:
transmission of the first respective control signals to the swarm-leader UAVs is performed as part of a first series of control signal transmissions having a first latency; and
transmission of the second respective control signals to the UAVs in the first set is performed as part of a second series of control signal transmissions having a second latency lower than a first latency.

12. The system of claim 1, wherein the one or more processors are configured to:
control navigation of the swarm-leader UAVs in accordance with the first respective control signals; and
control navigation of the UAVs in the first set in accordance with the second respective control signals.

13. A method for unmanned aerial vehicle (UAV) control, the method performed at a system comprising one or more processors and a plurality of UAVs, wherein the plurality of UAVs is divided into a plurality of respective UAV swarms, each UAV swarm comprising a respective subset of the plurality of UAVs, each subset including a respective swarm-leader UAV, the method comprising:
receiving first state data specifying respective position data and respective heading data corresponding to each of the swarm-leader UAVs;
executing a first control algorithm configured to determine first respective navigation instructions for each of the respective swarm-leader UAVs, based on the first state data, to navigate each of the respective swarm-leader UAVs toward a respective destination and to avoid confliction with the other swarms;
causing transmission of first respective control signals to the swarm-leader UAVs, wherein the respective control signals indicate the first respective navigation instructions for the respective swarm-leader UAV;
receiving second state data specifying respective position data and respective heading data corresponding to each UAV of a first set of UAVs, wherein the first set of UAVs comprise UAVs in a first swarm of the plurality of respective UAV swarms;
executing a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and
causing transmission of second respective control signals to UAVs in the first set, wherein the second respective control signals indicate the second respective navigation instructions for the respective UAVs in the first set,
wherein executing the first control algorithm comprises:
generating one or more respective first groups of mutually exclusive maneuverability options for each of the swarm-leader UAVs; and
determining the first respective navigation instructions by generating a first solution representing, for each of the one or more respective first groups of mutually exclusive maneuverability options for each of the plurality of swarm-leader UAVs, a respective lowest-cost maneuverability option for the respective swarm-leader UAV; and executing the second control algorithm comprises:
    generating one or more respective second groups of mutually exclusive maneuverability options for each of the UAVs in the first set; and
determining the second respective navigation instructions by generating a second solution representing, for each of the one or more respective second groups of mutually exclusive maneuverability options for each of the plurality of UAVs in the first set, a respective lowest-cost maneuverability option for the respective UAVs in the first set.

14. A non-transitory computer-readable storage medium storing instructions for unmanned aerial vehicle (UAV) control, the instructions configured to be executed by one or more processors of a system comprising a plurality of UAVs, wherein the plurality of UAVs is divided into a plurality of respective UAV swarms, each UAV swarm comprising a respective subset of the plurality of UAVs, each subset including a respective swarm-leader UAV, wherein the instructions are configured such that execution of the instructions causes the system to:
    receive first state data specifying respective position data and respective heading data corresponding to each of the swarm-leader UAVs;
execute a first control algorithm configured to determine first respective navigation instructions for each of the respective swarm-leader UAVs, based on the first state data, to navigate each of the respective swarm-leader UAVs toward a respective destination and to avoid confliction with the other swarms;
    cause transmission of first respective control signals to the swarm-leader UAVs, wherein the respective control signals indicate the first respective navigation instructions for the respective swarm-leader UAV;
    receive second state data specifying respective position data and respective heading data corresponding to each UAV of a first set of UAVs, wherein the first set of UAVs comprise UAVs in a first swarm of the plurality of respective UAV swarms;
    execute a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and
cause transmission of second respective control signals to UAVs in the first set, wherein the second respective control signals indicate the second respective navigation instructions for the respective UAVs in the first set,
wherein executing the first control algorithm comprises:
    generating one or more respective first groups of mutually exclusive maneuverability options for each of the swarm-leader UAVs; and
    determining the first respective navigation instructions by generating a first solution representing, for each of the one or more respective first groups of mutually exclusive maneuverability options for each of the plurality of swarm-leader UAVs, a respective lowest-cost maneuverability option for the respective swarm-leader UAV; and
executing the second control algorithm comprises:
    generating one or more respective second groups of mutually exclusive maneuverability options for each of the UAVs in the first set; and
determining the second respective navigation instructions by generating a second solution representing, for each of the one or more respective second groups of mutually exclusive maneuverability options for each of the plurality of UAVs in the first set, a respective lowest-cost maneuverability option for the respective UAVs in the first set.

15. A swarm-leader unmanned aerial vehicle (UAV) disposed in a system for swarm-based UAV control, wherein the swarm-leader UAV comprises one or more processors configured to:
    receive a first control signal indicating first navigation instructions for the swarm-leader UAV;
    receive swarm-member UAV state data for a plurality of swarm-member UAVs, wherein the plurality of swarm-member UAVs are members of a UAV swarm associated with the swarm-leader UAV, and wherein the swarm-member UAV state data specifies respective position data and respective heading data corresponding to each of the plurality of swarm-member UAVs;
    determine, based on a swarm-member UAV control algorithm applied to the received swarm-member UAV state data, respective navigation instructions for each of the plurality of swarm-member UAVs, wherein the respective navigation instructions are configured to navigate each of the plurality of swarm-member UAVs toward the swarm-leader UAV and to avoid confliction amongst the plurality of swarm-member UAVs; and
    cause transmission of respective swarm-member UAV control signals to the plurality of swarm-member UAVs, wherein the swarm-member UAV control signals indicate the respective navigation instructions for the plurality of swarm-member UAVs;
wherein:
    transmission of the first control signal to the swarm-leader UAVs is performed as part of a first series of control signal transmissions having a first latency; and
    transmission of the respective swarm-member UAV control signals is performed as part of a second series of control signal transmissions having a second latency lower than a first latency.

16. The swarm-leader UAV of claim 15, wherein the one or more processors are configured to control navigation of the swarm-member UAVs in accordance with the swarm-member UAV control signals indicating the respective navigation instructions for the plurality of swarm-member UAVs.

17. The swarm-leader UAV of claim 15, wherein determining the respective navigation instructions for each of the plurality of swarm-member UAVs comprises one or more of the following:
    (1) transmitting the received swarm-member UAV state data to a central processing system configured to execute the swarm-member UAV control algorithm, and receiving from the central processing system the respective navigation instructions for the plurality of swarm-member UAVs; and
    (2) executing the swarm-member UAV control algorithm locally at the swarm-leader UAV to generate the respective navigation instructions for the plurality of swarm-member UAVs.

18. The swarm-leader UAV of claim 15, wherein the one or more processors are configured to:
    transmit swarm-leader UAV state data to a central processing system, wherein the swarm-leader UAV state data specifies position data and heading data for the swarm-leader UAV, wherein the central processing system is configured to execute a swarm-leader UAV control algorithm that uses the swarm-leader state data, along with state data for other swarm-leader UAVs associated with different UAV swarms, to determine respective navigation instructions for the swarm-leader UAV and for each of the other swarm-leader UAVs, wherein the respective navigation instructions for the swarm-leader UAV and for each of the other swarm-leader UAVs are configured to navigate the swarm-leader UAV toward a respective associated destination, to navigate the other swarm-leader UAVs toward other respective associated destinations, and to avoid confliction between the swarm associated with the swarm-leader UAV and the different UAV swarms associated with the other swarm-leader UAVs; and receive, from the central processing system, a swarm-leader UAV control signal indicating the navigation instructions for the swarm-leader UAV.

19. The swarm-leader UAV of claim 18, wherein the one or more processors are configured to control navigation of the swarm-leader UAV in accordance with swarm-leader UAV control signal indicating the navigation instructions for the swarm-leader UAV.

20. A method for swarm-based unmanned aerial vehicle (UAV) control, the method performed at a swarm-leader UAV, wherein the swarm-leader UAV comprises one or more processors, the method comprising:

receiving a first control signal indicating first navigation instructions for the swarm-leader UAV;

receiving swarm-member UAV state data for a plurality of swarm-member UAVs, wherein the swarm-member UAVs are members of a UAV swarm associated with the swarm-leader UAV, and wherein the swarm-member UAV state data specifies respective position data and respective heading data corresponding to each of the plurality of swarm-member UAVs;

determining, based on a swarm-member UAV control algorithm applied to the received swarm-member UAV state data, respective navigation instructions for each of the plurality of swarm-member UAVs, wherein the respective navigation instructions are configured to navigate each of the plurality of swarm-member UAVs toward the swarm-leader UAV and to avoid confliction amongst the plurality of swarm-member UAVs; and causing transmission of respective swarm-member UAV control signals to the plurality of swarm-member UAVs, wherein the swarm-member UAV control signals indicate the respective navigation instructions for the plurality of swarm-member UAVs;

wherein:
transmission of the first control signal to the swarm-leader UAVs is performed as part of a first series of control signal transmissions having a first latency; and
transmission of the respective swarm-member UAV control signals is performed as part of a second series of control signal transmissions having a second latency lower than a first latency.

21. A non-transitory computer-readable storage medium storing instructions for swarm-based unmanned aerial vehicle (UAV) control, the instructions configured to be executed by one or more processors of a swarm-leader UAV, wherein the instructions are configured such that execution of the instructions causes the swarm-leader UAV to:

receive a first control signal indicating first navigation instructions for the swarm-leader UAV;

receive swarm-member UAV state data for a plurality of swarm-member UAVs, wherein the swarm-member UAVs are members of a UAV swarm associated with the swarm-leader UAV, and wherein the swarm-member UAV state data specifies respective position data and respective heading data corresponding to each of the plurality of swarm-member UAVs;

determine, based on a swarm-member UAV control algorithm applied to the received swarm-member UAV state data, respective navigation instructions for each of the plurality of swarm-member UAVs, wherein the respective navigation instructions are configured to navigate each of the plurality of swarm-member UAVs toward the swarm-leader UAV and to avoid confliction amongst the plurality of swarm-member UAVs; and cause transmission of respective swarm-member UAV control signals to the plurality of swarm-member UAVs, wherein the swarm-member UAV control signals indicate the respective navigation instructions for the plurality of swarm-member UAVs;

wherein:
transmission of the first control signal to the swarm-leader UAVs is performed as part of a first series of control signal transmissions having a first latency; and
transmission of the respective swarm-member UAV control signals is performed as part of a second series of control signal transmissions having a second latency lower than a first latency.

22. A system for unmanned aerial vehicle (UAV) control, the system comprising:

a plurality of UAVs, wherein the plurality of UAVs is divided into a plurality of respective UAV swarms, each UAV swarm comprising a respective subset of the plurality of UAVs, each subset including a respective swarm-leader UAV;

one or more processors configured to:
receive first state data specifying respective position data and respective heading data corresponding to each of the swarm-leader UAVs;
execute a first control algorithm configured to determine first respective navigation instructions for each of the respective swarm-leader UAVs, based on the first state data, to navigate each of the respective swarm-leader UAVs toward a respective destination and to avoid confliction with the other swarms;
cause transmission of first respective control signals to the swarm-leader UAVs, wherein the respective control signals indicate the first respective navigation instructions for the respective swarm-leader UAV;
receive second state data specifying respective position data and respective heading data corresponding to each UAV of a first set of UAVs, wherein the first set of UAVs comprise UAVs in a first swarm of the plurality of respective UAV swarms;
execute a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and
cause transmission of second respective control signals to UAVs in the first set, wherein the second respective control signals indicate the second respective navigation instructions for the respective UAVs in the first set;

wherein the one or more processors comprise:
one or more classical processors configured to receive the first state data, cause the transmission of the first respective control signals, receive the second state data, and cause transmission of the second respective control signals; and one or more quantum processors configured to execute at least a portion of the first control algorithm and to execute at least a portion of the second control algorithm.

23. The system of claim 22, wherein:
executing the first control algorithm comprises:
- generating one or more respective first groups of mutually exclusive maneuverability options for each of the swarm-leader UAVs;
- determining the first respective navigation instructions by generating a first solution representing, for each of the one or more respective first groups of mutually exclusive maneuverability options for each of the plurality of swarm-leader UAVs, a respective lowest-cost maneuverability option for the respective swarm-leader UAV;
- calculating, based on the first state data, a respective distance to the respective destination for each of the respective swarm-leader UAVs;
- calculating, based on the first state data, a respective inter-UAV repulsion for each of the respective swarm-leader UAVs; and
- generating the one or more first groups of mutually exclusive maneuverability options based on the respective distance to the respective destination for each of the respective swarm-leader UAVs and on the respective inter-UAV repulsion for each of the respective swarm-leader UAVs; and executing the second control algorithm comprises:
- generating one or more respective second groups of mutually exclusive maneuverability options for each of the UAVs in the first set;
- determining the second respective navigation instructions by generating a second solution representing, for each of the one or more respective second groups of mutually exclusive maneuverability options for each of the plurality of UAVs in the first set, a respective lowest-cost maneuverability option for the respective UAVs in the first set;
- calculating, based on the second state data, a respective distance to the swarm-leader UAV for the respective UAVs in the first set;
- calculating, based on the second state data, a respective inter-UAV repulsion for each of the respective UAVs in the first set; and
- generating the one or more second groups of mutually exclusive maneuverability options based on the respective distances to swarm-leader UAV for each of the respective UAVs in the first set and on the respective inter-UAV repulsion for each of the respective UAVs in the first set.

24. The system of claim 23, wherein inter-UAV repulsion for each of the respective swarm-leader UAVs and inter-UAV repulsion for each of the respective UAVs in the first set are weighted differently, such that repulsion between pairs of UAVs in the first set is weaker than repulsion between UAVs in different swarms.

25. The system of claim 22, wherein the one or more processors are configured to:
receive third state data specifying respective position data and respective heading data corresponding to each UAV of a second set of UAVs, wherein the second set of UAVs comprise UAVs in a second swarm of the plurality of respective UAV swarms;

determine, based on one or more of the first state data, the second state data, and the third state data, whether a first set of one or more merging criteria are satisfied;

if it is determined that the first set of one or more merging criteria are not satisfied:
- execute a third control algorithm, separate from the second control algorithm, with respect to the second set of UAVs, wherein the third control algorithm is configured to determine third respective navigation instructions for each UAV in the second set, based on the third state data, to navigate each of the respective UAVs in the second set toward a swarm-leader UAV for the second swarm and to avoid confliction with other UAVs in the second set; and
- cause transmission of third respective control signals to UAVs in the second set, wherein the third respective control signals indicate the third respective navigation instructions for the respective UAVs in the second set; and if it is determined that the first set of one or more merging criteria are satisfied:
- execute the second control algorithm collectively with respect to the first set of UAVs and the second set of UAVs, wherein determining the second respective navigation instructions comprises determining the second respective navigation instructions for each UAV in the second set, based on the second state data and the third state data, to navigate each of the respective UAVs in the second set toward a swarm-leader UAV for the second swarm and to avoid confliction with other UAVs in the first set and in the second set; and
- cause transmission of the second respective control signals to UAVs in the second set.

26. The system of claim 25, wherein executing the second control algorithm collectively comprises:
- generating one or more respective second groups of mutually exclusive maneuverability options for each of the UAVs in either the first set or the second set; and
- determining the second respective navigation instructions by generating a second solution representing, for each of the one or more respective second groups of mutually exclusive maneuverability options for each of the plurality of UAVs in either the first set or the second set, a respective lowest-cost maneuverability option for the respective UAVs in either the first set or the second set.

27. The system of claim 25, wherein determining whether the first set of one or more merging criteria are satisfied comprises determining whether one or more UAVs in the first swarm are within a threshold minimum distance from one or more UAVs in the second swarm.

28. The system of claim 25, wherein determining whether the first set of one or more merging criteria are satisfied comprises determining whether one or more UAVs in the first swarm and one or more UAVs in the second swarm will come within a threshold minimum distance from one another within a threshold amount of time.

29. The system of claim 22, wherein the one or more processors comprise:
- a set of one or more central processors configured to execute the first control algorithm and cause transmission of the first respective control signals to the swarm-leader UAVs; and
- a set of one or more swarm-specific processors configured to execute the second control algorithm and cause transmission of the second respective control signals to UAVs in the first set.

30. The system of claim 29, wherein:
the set of one or more swarm-specific processors is disposed onboard a swarm-leader UAV for the first swarm; and
transmission of the second respective control signals to UAVs in the first set is transmitted from the swarm-leader UAV for the first swarm.

31. The system of claim 22, wherein:
transmission of the first respective control signals to the swarm-leader UAVs is performed as part of a first series of control signal transmissions having a first latency; and
transmission of the second respective control signals to the UAVs in the first set is performed as part of a second series of control signal transmissions having a second latency lower than a first latency.

32. The system of claim 22, wherein the one or more processors are configured to:
control navigation of the swarm-leader UAVs in accordance with the first respective control signals; and
control navigation of the UAVs in the first set in accordance with the second respective control signals.

33. A method for unmanned aerial vehicle (UAV) control, the method performed at a system comprising one or more processors and a plurality of UAVs, wherein the plurality of UAVs is divided into a plurality of respective UAV swarms, each UAV swarm comprising a respective subset of the plurality of UAVs, each subset including a respective swarm-leader UAV, the method comprising:
receiving first state data specifying respective position data and respective heading data corresponding to each of the swarm-leader UAVs;
executing a first control algorithm configured to determine first respective navigation instructions for each of the respective swarm-leader UAVs, based on the first state data, to navigate each of the respective swarm-leader UAVs toward a respective destination and to avoid confliction with the other swarms;
causing transmission of first respective control signals to the swarm-leader UAVs, wherein the respective control signals indicate the first respective navigation instructions for the respective swarm-leader UAV;
receiving second state data specifying respective position data and respective heading data corresponding to each UAV of a first set of UAVs, wherein the first set of UAVs comprise UAVs in a first swarm of the plurality of respective UAV swarms;
executing a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and
causing transmission of second respective control signals to UAVs in the first set, wherein the second respective control signals indicate the second respective navigation instructions for the respective UAVs in the first set;
wherein the method is performed by a system comprising one or more processors, wherein the one or more processors comprise:
one or more classical processors configured to receive the first state data, cause the transmission of the first respective control signals, receive the second state data, and cause transmission of the second respective control signals; and
one or more quantum processors configured to execute at least a portion of the first control algorithm and to execute at least a portion of the second control algorithm.

34. A non-transitory computer-readable storage medium storing instructions for unmanned aerial vehicle (UAV) control, the instructions configured to be executed by one or more processors of a system comprising a plurality of UAVs, wherein the plurality of UAVs is divided into a plurality of respective UAV swarms, each UAV swarm comprising a respective subset of the plurality of UAVs, each subset including a respective swarm-leader UAV, wherein the instructions are configured such that execution of the instructions causes the system to:
receive first state data specifying respective position data and respective heading data corresponding to each of the swarm-leader UAVs;
execute a first control algorithm configured to determine first respective navigation instructions for each of the respective swarm-leader UAVs, based on the first state data, to navigate each of the respective swarm-leader UAVs toward a respective destination and to avoid confliction with the other swarms;
cause transmission of first respective control signals to the swarm-leader UAVs, wherein the respective control signals indicate the first respective navigation instructions for the respective swarm-leader UAV;
receive second state data specifying respective position data and respective heading data corresponding to each UAV of a first set of UAVs, wherein the first set of UAVs comprise UAVs in a first swarm of the plurality of respective UAV swarms;
execute a second control algorithm configured to determine second respective navigation instructions for each UAV in the first set, based on the second state data, to navigate each of the respective UAVs in the first set toward a swarm-leader UAV for the first swarm and to avoid confliction with other UAVs in the first set; and
cause transmission of second respective control signals to UAVs in the first set, wherein the second respective control signals indicate the second respective navigation instructions for the respective UAVs in the first set;
wherein the one or more processors comprise:
one or more classical processors configured to receive the first state data, cause the transmission of the first respective control signals, receive the second state data, and cause transmission of the second respective control signals; and
one or more quantum processors configured to execute at least a portion of the first control algorithm and to execute at least a portion of the second control algorithm.

* * * * *